US012781775B2

(12) United States Patent
Tamura

(10) Patent No.: US 12,781,775 B2
(45) Date of Patent: Nov. 3, 2026

(54) CYLINDER DEVICE

(71) Applicant: SMC CORPORATION, Tokyo (JP)

(72) Inventor: Ken Tamura, Tsukubamirai (JP)

(73) Assignee: SMC CORPORATION, Tokyo (JP)

( * ) Notice: Subject to any disclaimer, the term of this patent is extended or adjusted under 35 U.S.C. 154(b) by 0 days.

(21) Appl. No.: 19/155,365

(22) PCT Filed: Dec. 8, 2023

(86) PCT No.: PCT/JP2023/044060

§ 371 (c)(1),
(2) Date: Aug. 11, 2025

(87) PCT Pub. No.: WO2024/171578

PCT Pub. Date: Aug. 22, 2024

(65) Prior Publication Data

US 2026/0235143 A1 Aug. 13, 2026

(30) Foreign Application Priority Data

Feb. 17, 2023 (JP) ................................ 2023-023123

(51) Int. Cl.
*F15B 15/06* (2006.01)
*F15B 15/14* (2006.01)

(52) U.S. Cl.
CPC ........ *F15B 15/063* (2013.01); *F15B 15/1447* (2013.01); *F15B 15/1457* (2013.01); *F15B 15/148* (2013.01); *F15B 15/1409* (2013.01); *F15B 15/1414* (2013.01); *F15B 15/1419* (2013.01)

(58) Field of Classification Search
CPC .......................... F15B 15/063; F15B 15/1447; F15B 15/1457; F15B 15/148
See application file for complete search history.

(56) References Cited

U.S. PATENT DOCUMENTS 5,927,700 A * 7/1999 Yonezawa ............. F16H 25/186
269/25
6,666,440 B2 * 12/2003 Yonezawa ............... B25B 5/062
269/29

(Continued)

FOREIGN PATENT DOCUMENTS

JP 2017-227223 A 12/2017

OTHER PUBLICATIONS

International Search Report issued on Feb. 20, 2024, in PCT/JP2023/044060 filed on Dec. 8, 2023, therein 2 pages.

*Primary Examiner* — Matthew Wiblin
(74) *Attorney, Agent, or Firm* — Oblon, McClelland, Maier & Neustadt, L.L.P.

(57) ABSTRACT

A cylinder device includes a guide member fixed to a body; a piston member displaced only in the axial direction; a piston rod displaceable in the circumferential direction and the axial direction; and a conversion mechanism that converts some of the displacement of the piston member to circumferential displacement. The conversion mechanism includes an L-shaped displacement switching groove provided to the guide member; a helical groove provided to the piston member and inclined with respect to the axial direction; and a link pin supported by the piston rod and that moves along the displacement switching groove and the helical groove.

7 Claims, 26 Drawing Sheets

(56) References Cited

U.S. PATENT DOCUMENTS

| | | | | |
|---|---|---|---|---|
| 6,929,254 | B2 * | 8/2005 | Steele | B25B 5/062 269/92 |
| 9,033,324 | B2 * | 5/2015 | Chou | B23Q 3/069 269/25 |
| 2005/0040578 | A1 * | 2/2005 | Sawdon | B25B 5/087 269/32 |
| 2006/0174760 | A1 * | 8/2006 | Rentz | B23Q 3/069 92/33 |
| 2009/0152784 | A1 * | 6/2009 | Yonezawa | B25B 5/062 269/27 |
| 2012/0292843 | A1 * | 11/2012 | Yokota | B23Q 3/069 269/20 |
| 2017/0363208 | A1 | 12/2017 | Ishii et al. | |

* cited by examiner

10C

10D

10D

CYLINDER DEVICE

TECHNICAL FIELD

The present invention relates to a cylinder device that causes a piston rod to be displaced in an axial direction and a circumferential direction.

BACKGROUND ART

In an automated factory line, a clamp cylinder (a cylinder device) is used for clamping objects. Such a cylinder device serves to clamp an object by utilizing a rotational motion of a piston rod at an extruded end, and an axial linear motion of the piston rod toward a retracted end.

The cylinder device that is used to carry out clamping is equipped with a conversion mechanism that converts a portion of the displacement in the axial direction of the piston into a displacement in the circumferential direction, and transmits, to the piston rod, another portion of the displacement in the axial direction of the piston as a linear displacement.

For example, the conversion mechanism of JP 2017-227223 A includes a structure in which two grooves are provided in the piston rod, and the piston rod and the piston are connected by two pins that slide in the respective grooves.

SUMMARY OF THE INVENTION

A conventional cylinder device has a problem in that the structure of the conversion mechanism is complicated, thereby increasing the manufacturing cost. Further, since it is necessary to dispose, in the piston rod, two grooves alongside one another in the axial direction, the overall length of the cylinder device becomes long, which brings about a problem in that it is difficult to reduce the size thereof.

The present invention has the object of solving the aforementioned problem.

One aspect of the following disclosure is characterized by a cylinder device, comprising a guide member configured to be fixed in a circumferential direction and an axial direction, a piston member configured to be fixed in the circumferential direction and displaced in the axial direction, a piston rod configured to be displaced in the circumferential direction and the axial direction, and a conversion mechanism configured to convert a portion of a displacement in the axial direction of the piston member into a displacement in the circumferential direction, and to transmit the displacement in the circumferential direction to the piston rod, wherein the conversion mechanism is disposed at a portion in which the guide member, the piston member, and the piston rod overlap in a radial direction, and the conversion mechanism includes a displacement switching groove provided in either one of the guide member or the piston member, and including an axially directed part configured to extend in the axial direction, and a circumferentially directed part configured to extend in the circumferential direction, the axially directed part and the circumferentially directed part being connected in an L-shape, a helical groove provided in another one of the guide member or the piston member, disposed so as to overlap the displacement switching groove in the radial direction, and inclined with respect to the axial direction, and a link pin supported by the piston rod, and configured to extend in the radial direction, to be inserted into the displacement switching groove and the helical groove, and to move along the displacement switching groove and the helical groove.

In the above-described cylinder device, since the guide member, the piston member, and the piston rod are capable of being connected by a single link pin, the number of the grooves and the number of the link pins can be reduced, and the manufacturing cost can be suppressed. Further, in the above-described cylinder device, by disposing a plurality of the grooves so as to overlap in the radial direction, the overall length of the cylinder device can be made shorter.

The above and other objects, features, and advantages of the present invention will be more easily understood from the following description of the embodiments, which are described with reference to the accompanying drawings.

Figure 14A:
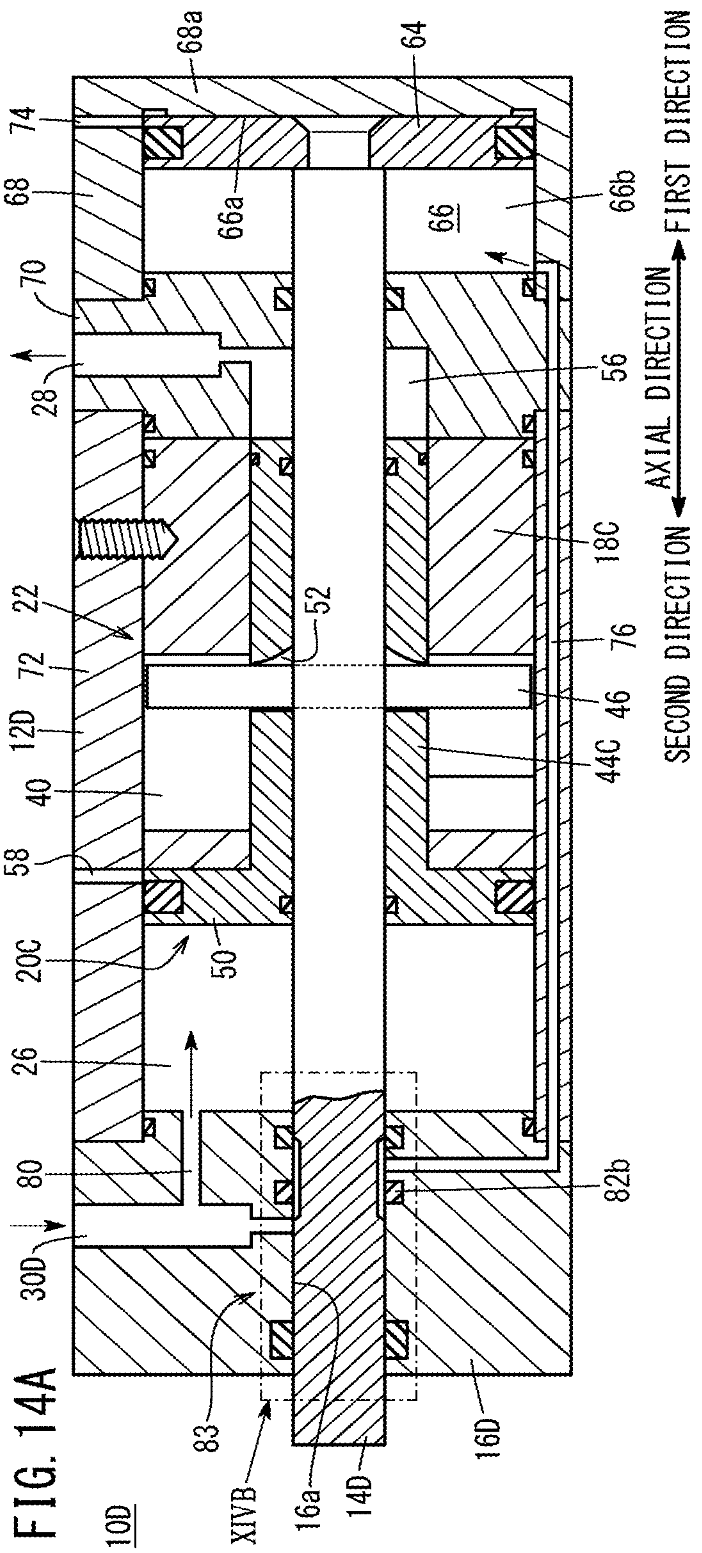
FIG. 14A is a cross-sectional view illustrating a retracting motion of the cylinder device shown in FIG. 12A, and FIG.
Figure 14B:
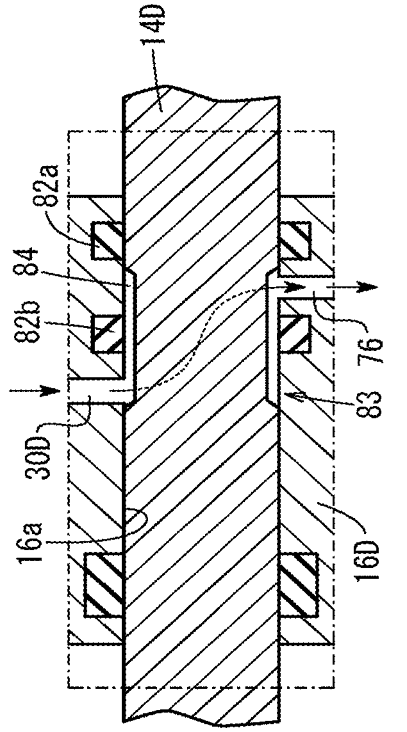
Figure 15A:
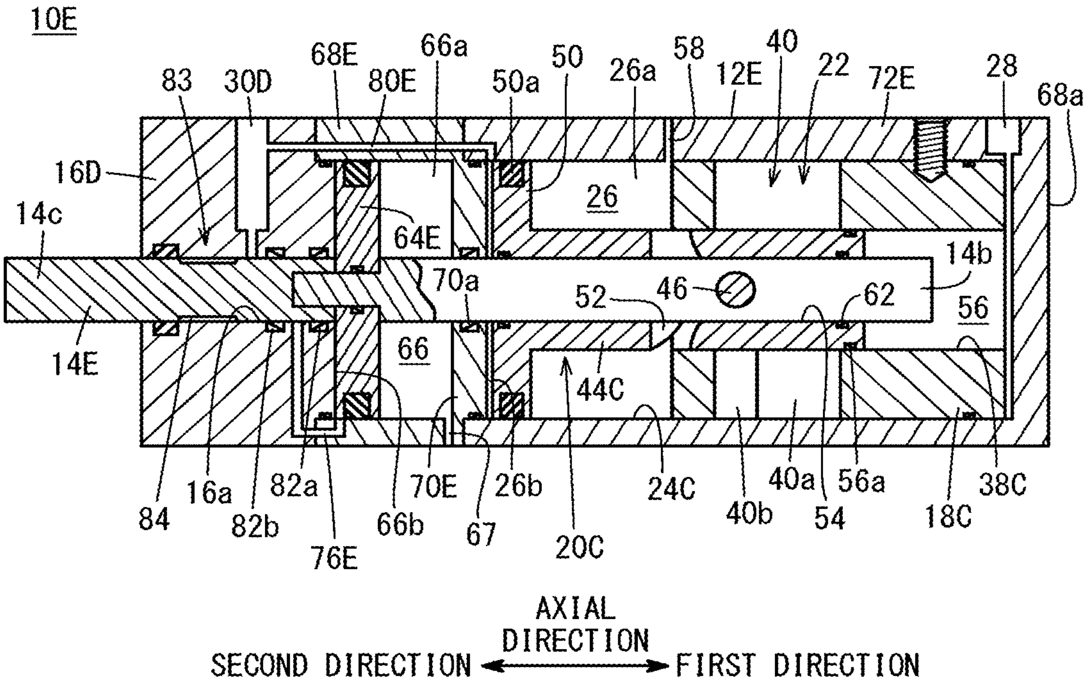
Figure 15B:
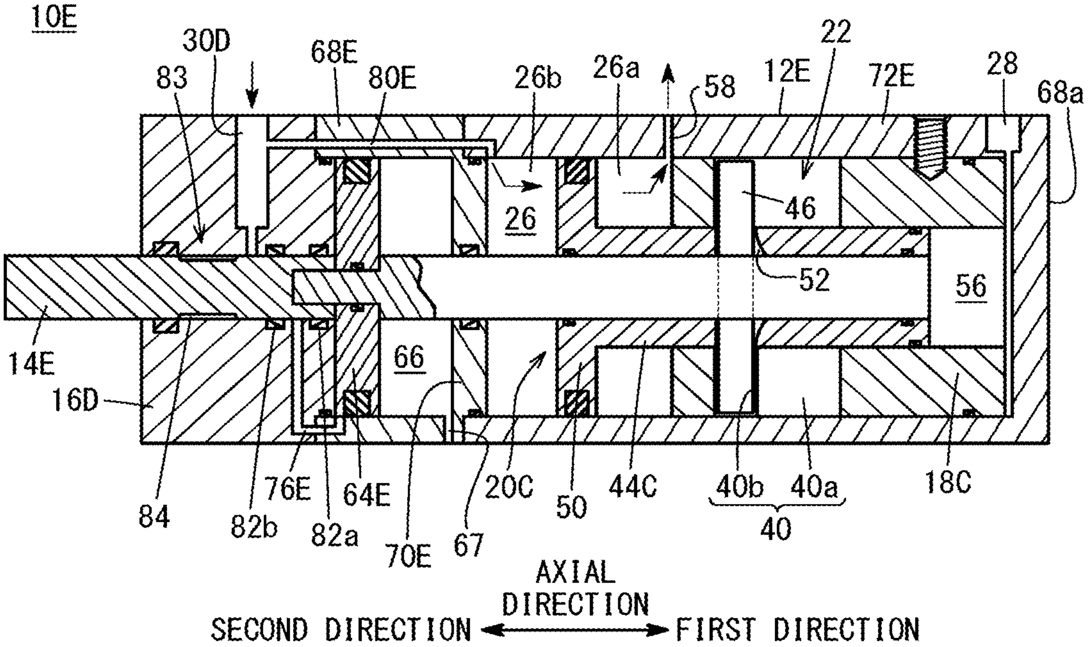
Figure 16:
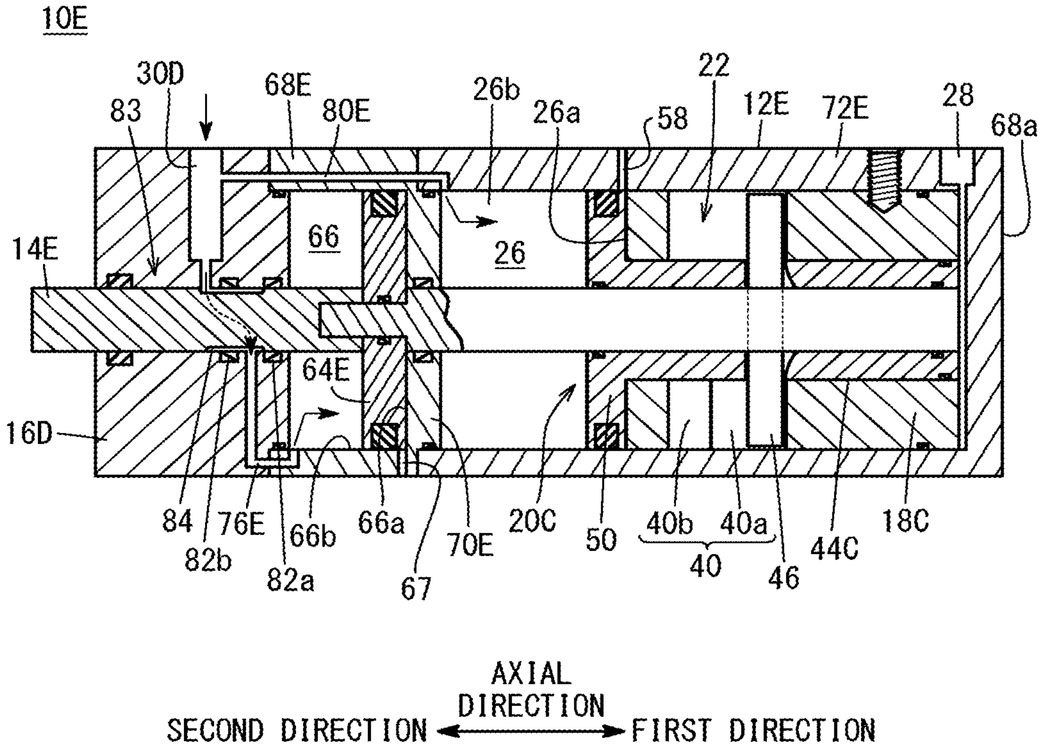
Figure 17:
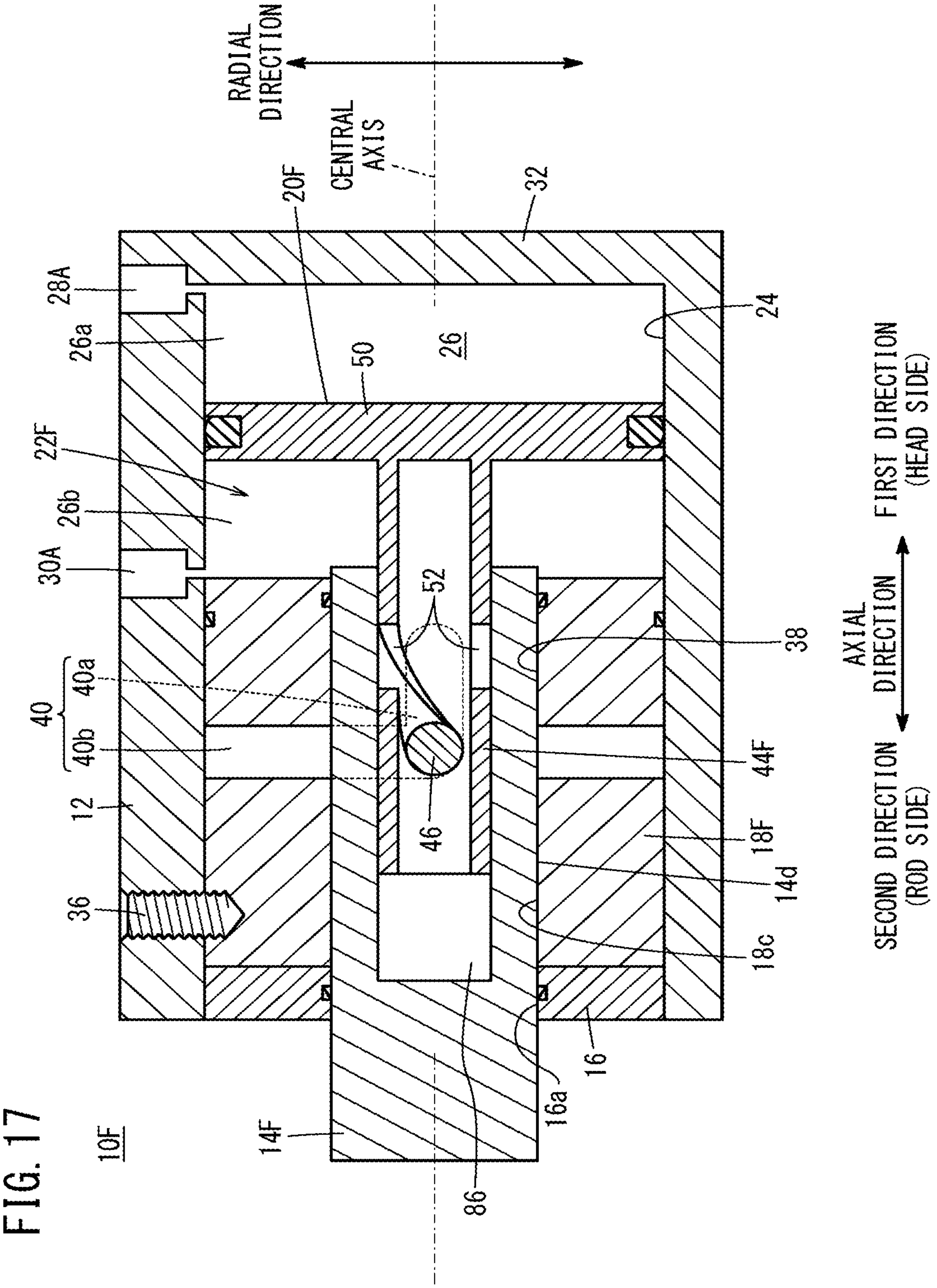
Figure 18:
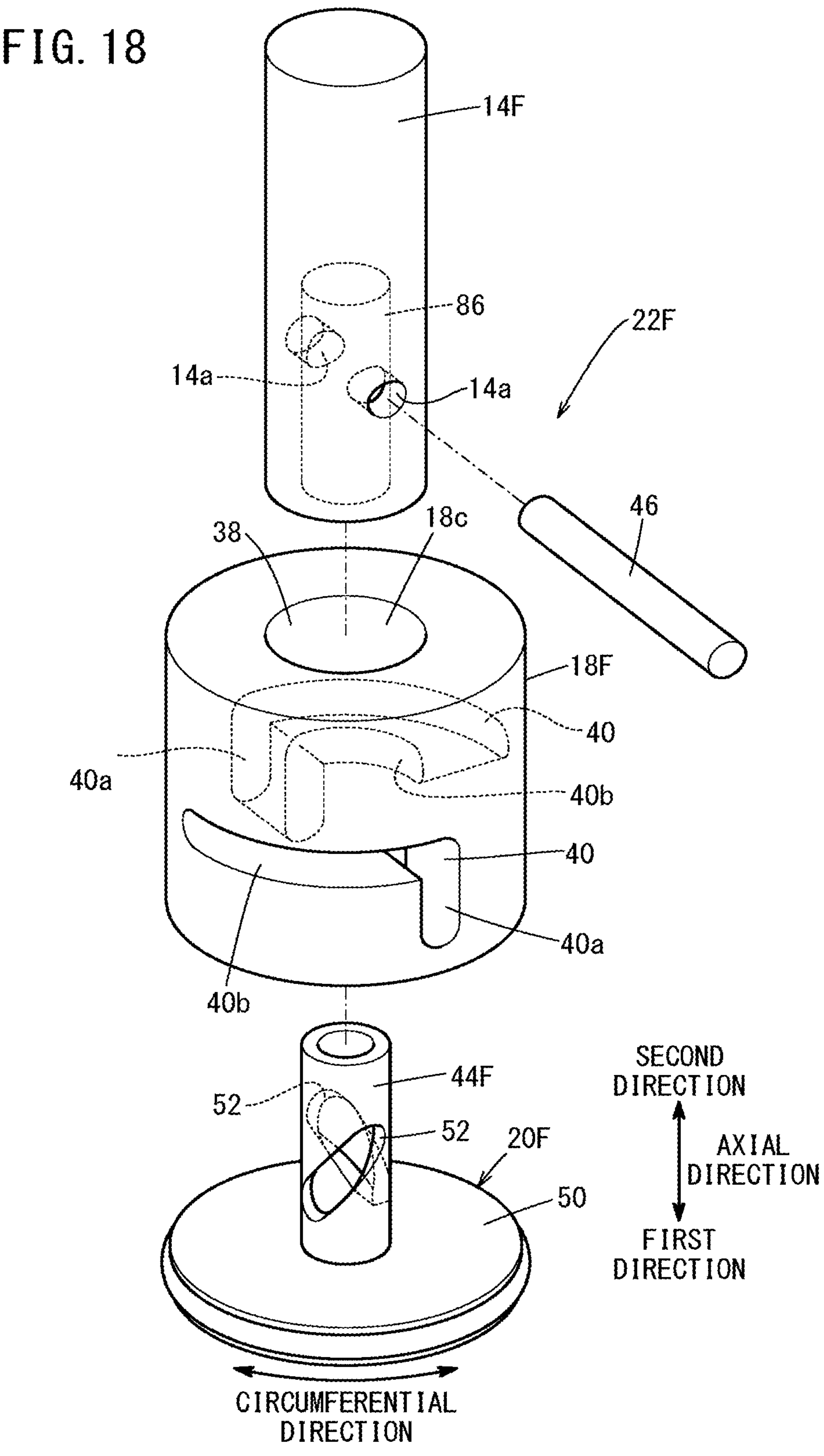
Figure 19:
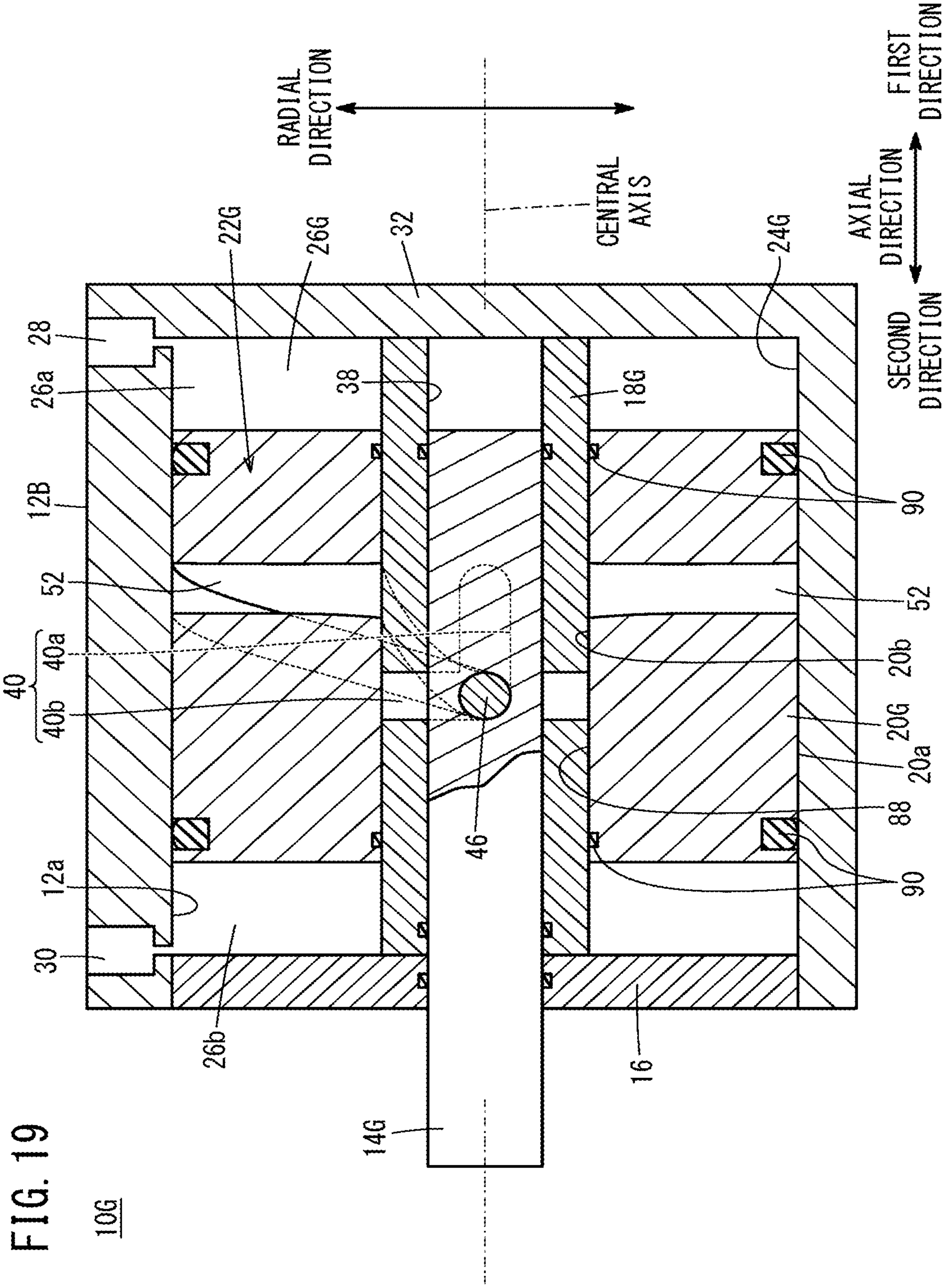
Figure 20:
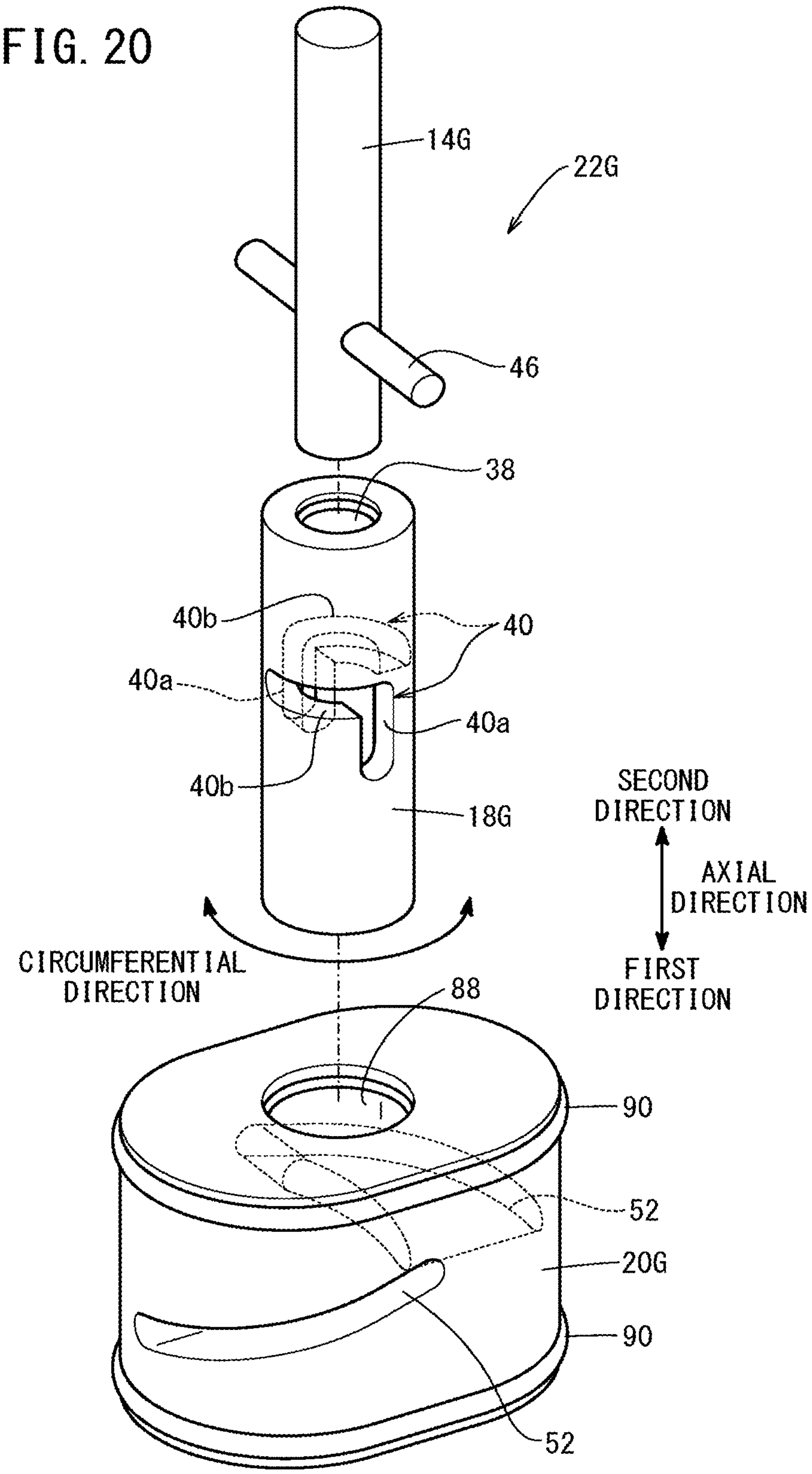
Figure 21:
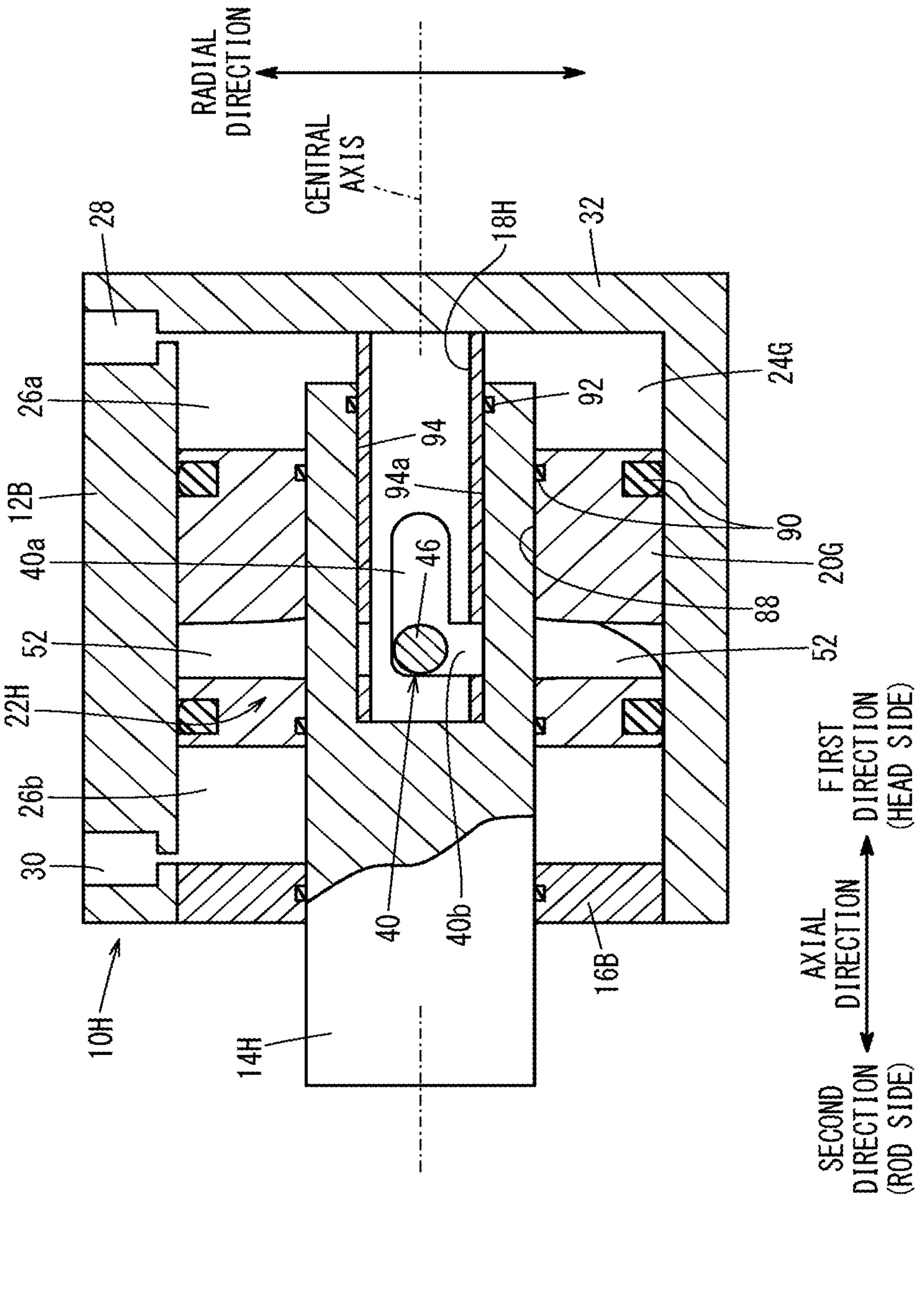
Figure 22:
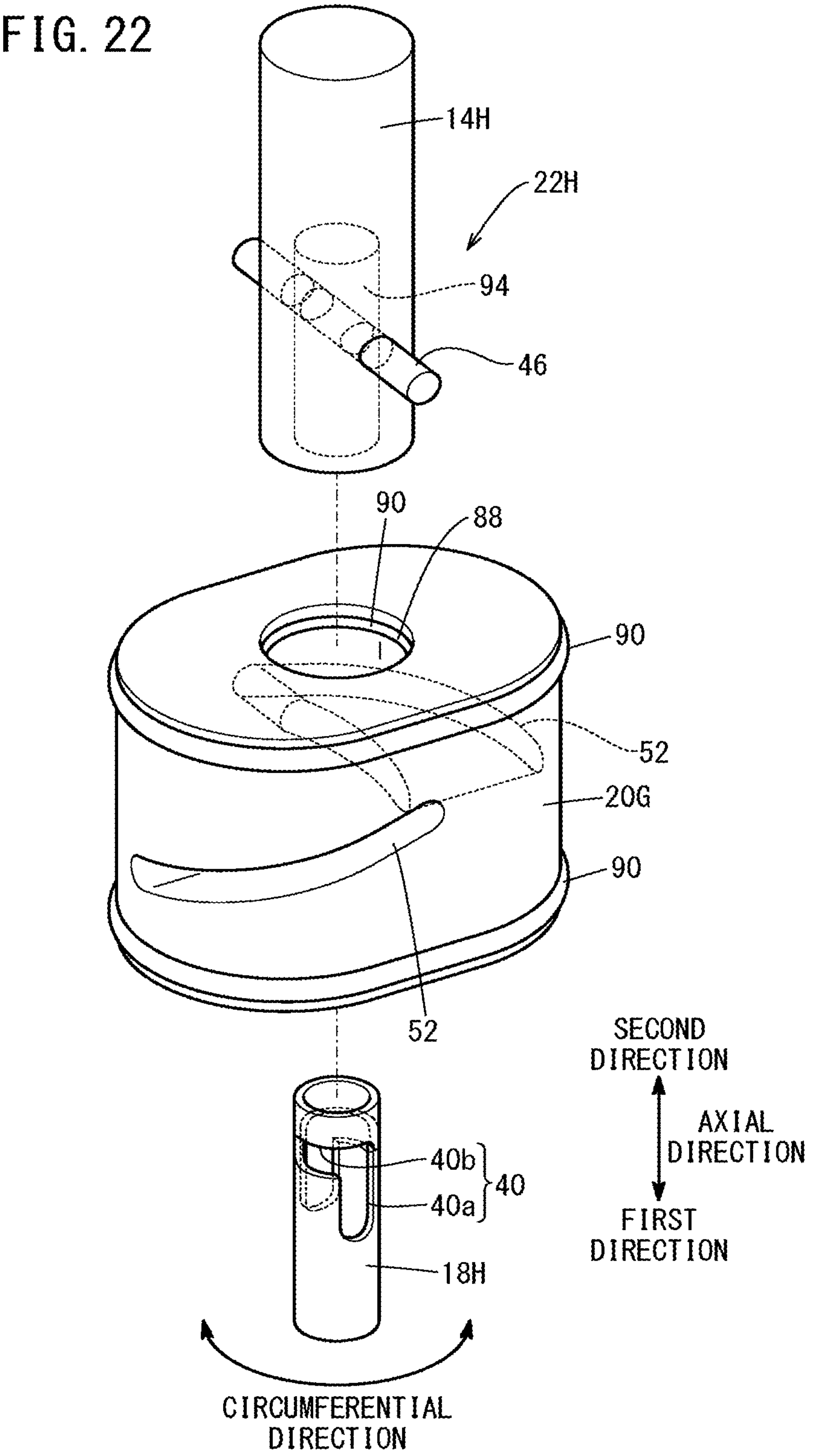
Figure 23:
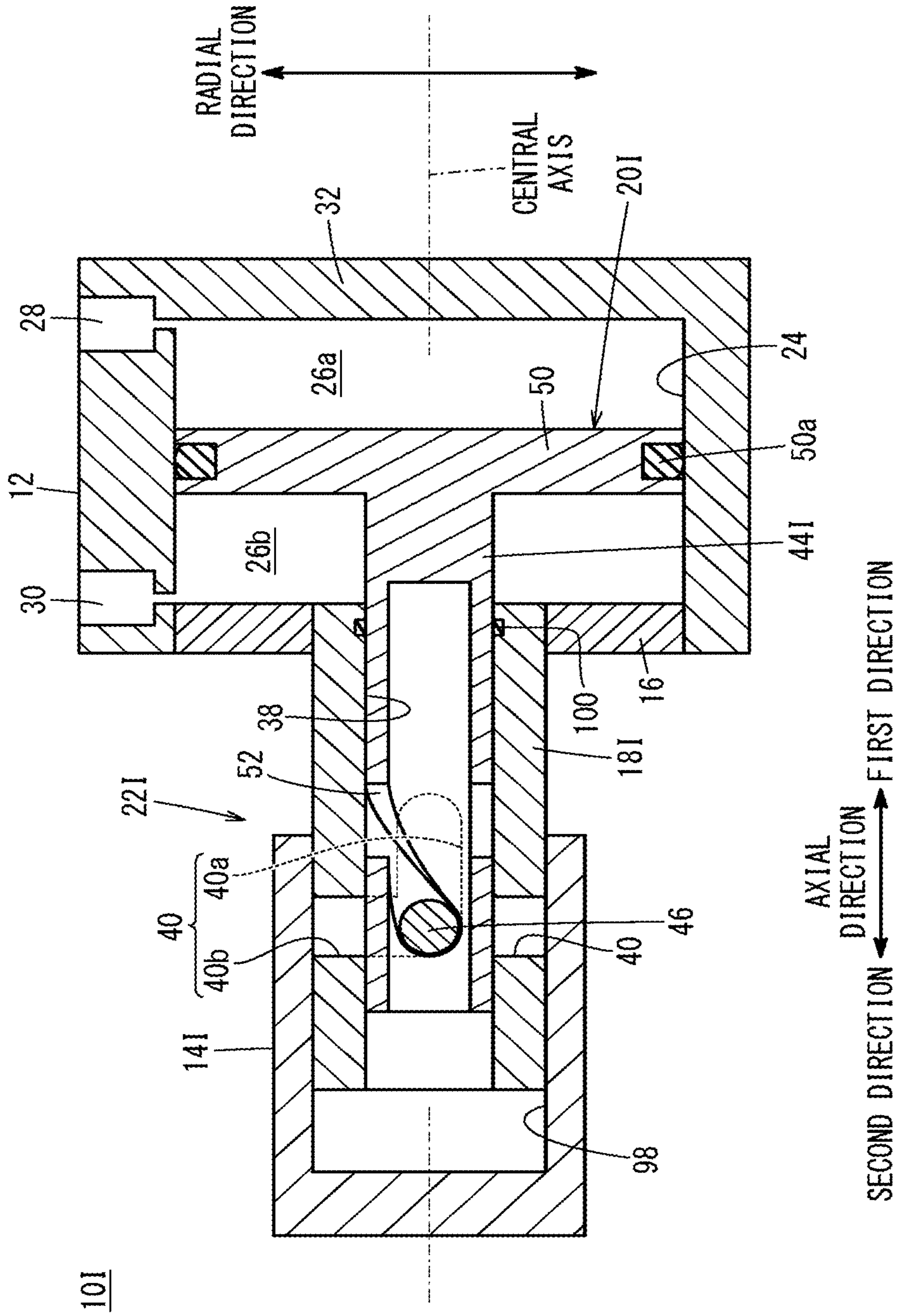
Figure 24:
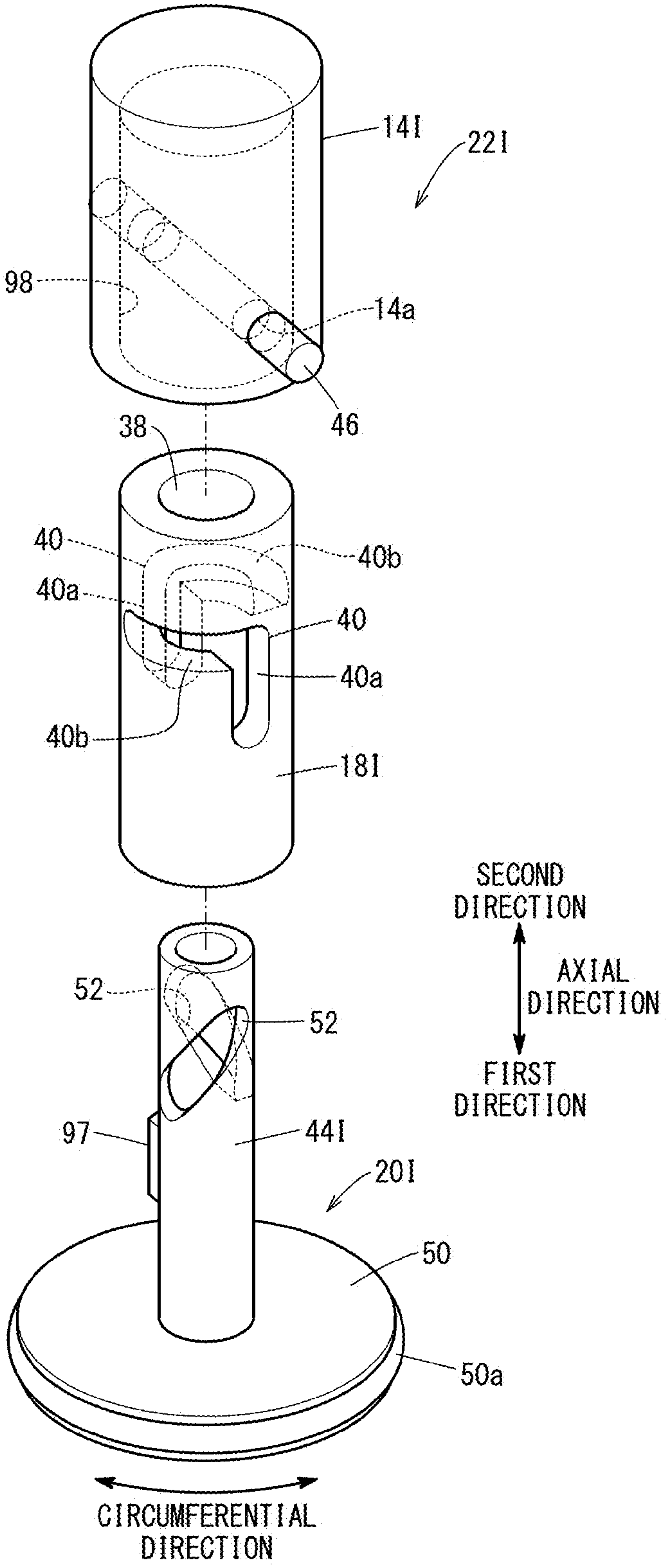
Figure 25:
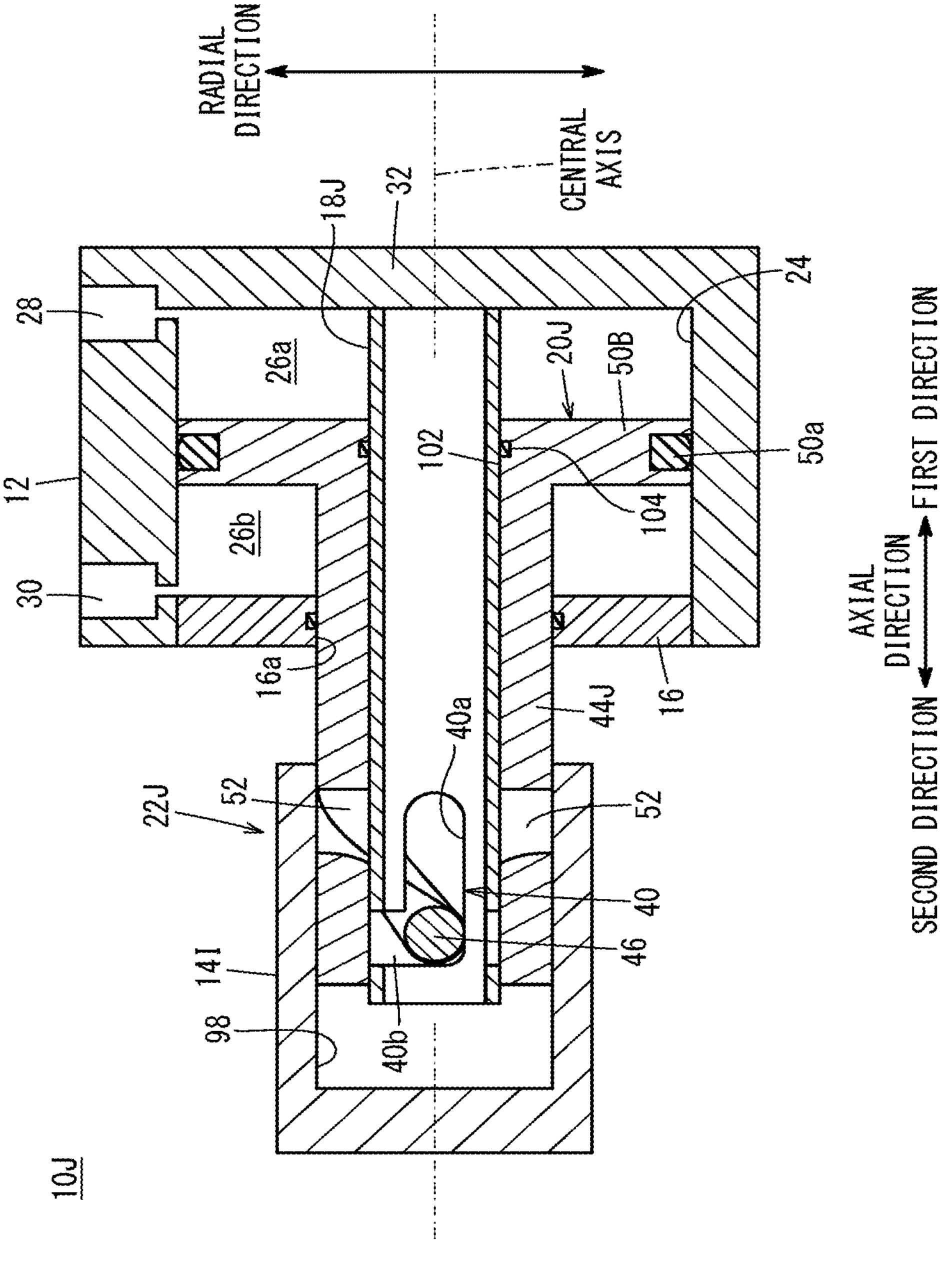
Figure 26:
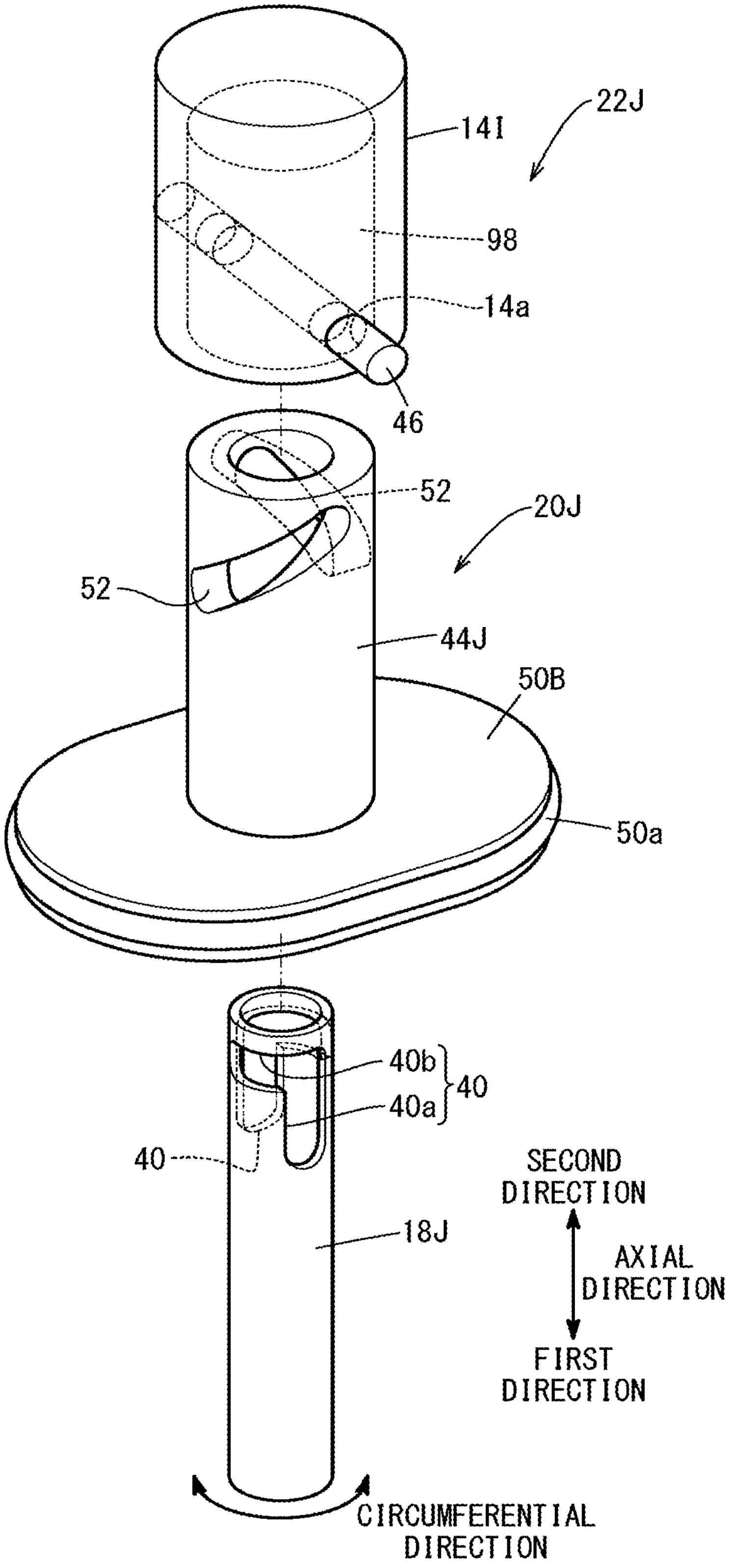

14B is a partially enlarged cross-sectional view of the rod cover and the piston rod shown in FIG. 14A;

FIG. 15A is a cross-sectional view of a cylinder device according to a sixth embodiment, and FIG. 15B is a cross-sectional view at a rotation end position of the cylinder device shown in FIG. 15A;

FIG. 16 is a cross-sectional view illustrating a retracting motion of the cylinder device shown in FIG. 15A;

FIG. 17 is a cross-sectional view of a cylinder device according to a seventh embodiment;

FIG. 18 is a perspective view showing in an exploded state of a piston rod, a piston member, and a guide member shown in FIG. 17;

FIG. 19 is a cross-sectional view of a cylinder device according to an eighth embodiment;

FIG. 20 is a perspective view showing in an exploded state of a piston rod, a piston member, and a guide member shown in FIG. 19;

FIG. 21 is a cross-sectional view of a cylinder device according to a ninth embodiment;

FIG. 22 is a perspective view showing in an exploded state of a piston rod, a piston member, and a guide member shown in FIG. 21;

FIG. 23 is a cross-sectional view of a cylinder device according to a tenth embodiment;

FIG. 24 is a perspective view showing in an exploded state of a piston rod, a piston member, and a guide member shown in FIG. 23;

FIG. 25 is a cross-sectional view of a cylinder device according to an eleventh embodiment; and FIG. 26 is a perspective view showing in an exploded state of a piston rod, a piston member, and a guide member shown in FIG. 25.

DETAILED DESCRIPTION OF THE INVENTION

First Embodiment

Figure 1:
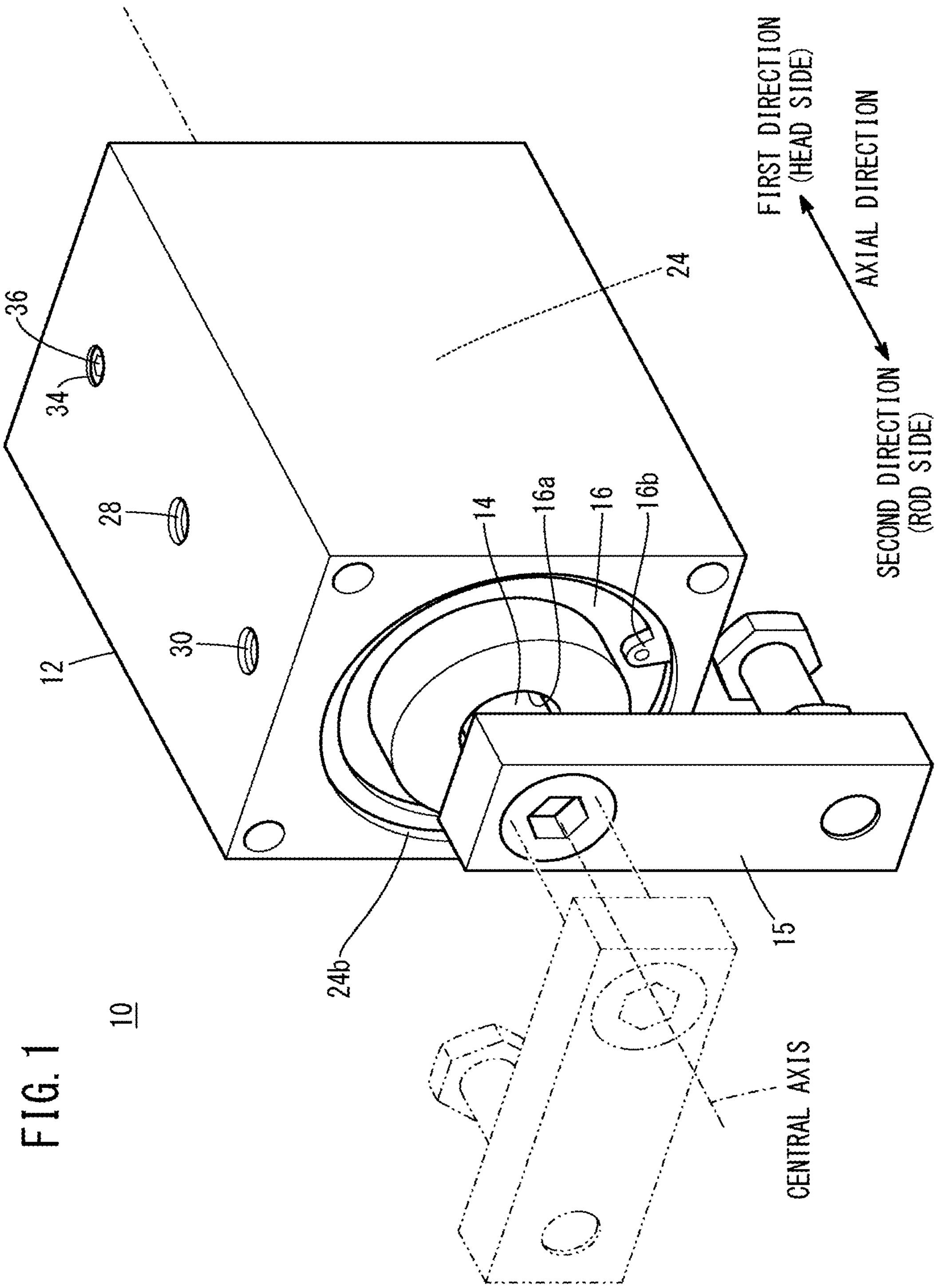
FIG. 1 is a perspective view of a cylinder device according to a first embodiment.

A cylinder device 10 according to the present embodiment shown in FIG. 1 is also referred to as a clamp cylinder. The cylinder device 10 is used, for example, in order to fix a workpiece that serves as an object to be machined in an automated production line. The cylinder device 10 is equipped with a piston rod 14 that projects out from a body 12, and a clamp arm 15 mounted on an end part of the piston rod 14. The piston rod 14 carries out a rotational motion at an extruded end (an unclamped end), and after the rotational motion, carries out a linear displacement toward a retracted end (a clamped end). The clamp arm 15 is displaced between an unclamped position shown by the two-dot dashed line, and a clamped position shown by the solid line in FIG. 1. The cylinder device 10 clamps the workpiece by the operation of the piston rod 14 and the clamp arm 15. Moreover, in the present specification, an extending direction of the piston rod 14 is referred to as an axial direction. Further, in the axial direction, the direction toward the retracted end is referred to as a first direction or a head side, and the direction toward the extruded end is referred to as a second direction or a rod side.

Figure 2:
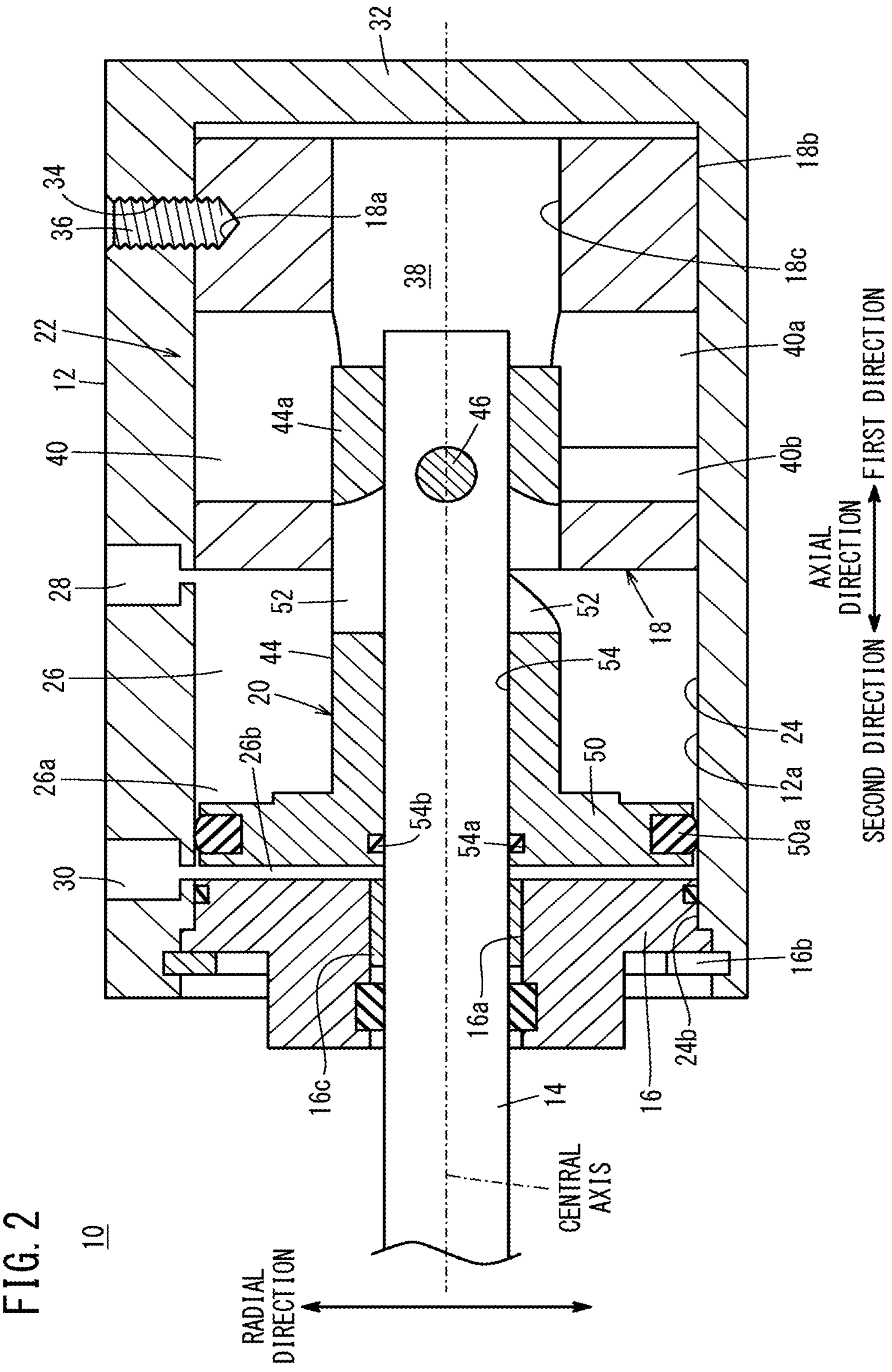
FIG. 2 is a cross-sectional view of the cylinder device shown in FIG. 1.

As shown in FIG. 2, the cylinder device 10 is equipped with the body 12 (a cylinder tube), the piston rod 14, a rod cover 16, a guide member 18, a piston member 20, and a conversion mechanism 22.

As shown in FIG. 1, the body 12 is a tubular member having an outer shape in the form of a rectangular parallelepiped. The body 12, for example, is formed from a material such as a metal or the like. The body 12 includes a cylinder hole 24 extending in the axial direction in the interior thereof. The cylinder hole 24 includes a space formed inside the body 12. The cylinder hole 24 has a cross section perpendicular to the axial direction that is circular shaped, polygonal shaped, elliptical shaped, or the like.

As shown in FIG. 2, an end part of the cylinder hole 24 in the first direction is closed by an end wall 32 of the body 12. An end part of the cylinder hole 24 in the second direction forms an opening 24*b*. The opening 24*b* of the cylinder hole 24 is sealed by the rod cover 16. The guide member 18 is disposed on the first direction side of the cylinder hole 24. The guide member 18 is a member that serves to guide the displacement of the piston rod 14. The guide member 18 will be described later.

The cylinder hole 24 includes a first cylinder chamber 26 that is positioned adjacent in the second direction to the guide member 18. Moreover, in the present specification, the cylinder chamber is a chamber in which a piston 50, 50B is disposed. The first cylinder chamber 26 accommodates the piston 50 of the piston member 20. A first port 28 and a second port 30, through which a fluid is supplied and discharged, open into the first cylinder chamber 26. The first port 28 penetrates through a side wall of the body 12, and opens on an end part (including the end part and the vicinity thereof) of the first cylinder chamber 26 in the first direction. The second port 30 penetrates through the side wall of the body 12, and opens on an end part (including the end part and the vicinity thereof) of the first cylinder chamber 26 in the second direction. An external pipe is connected to each of the first port 28 and the second port 30. The first port 28 and the second port 30 serve to supply and discharge the fluid into and from the first cylinder chamber 26.

The rod cover 16 is a member having a T-shaped cross section, and includes a cover hole 16*a* in a central part thereof through which the piston rod 14 inserted. A rod bush 16*c* is installed in the cover hole 16*a*. The rod bush 16*c* is a tubular member through which the piston rod 14 is inserted, and serves to prevent outflowing of the fluid through a gap between the piston rod 14 and the rod cover 16. The piston rod 14 is inserted through the cover hole 16*a* and the rod bush 16*c* so as to be capable of rotating and being displaced in the axial direction with respect to the rod cover 16. As shown in FIG. 1, the rod cover 16 is fixed to the body 12, for example, by a retaining ring 16*b*.

Figure 3:
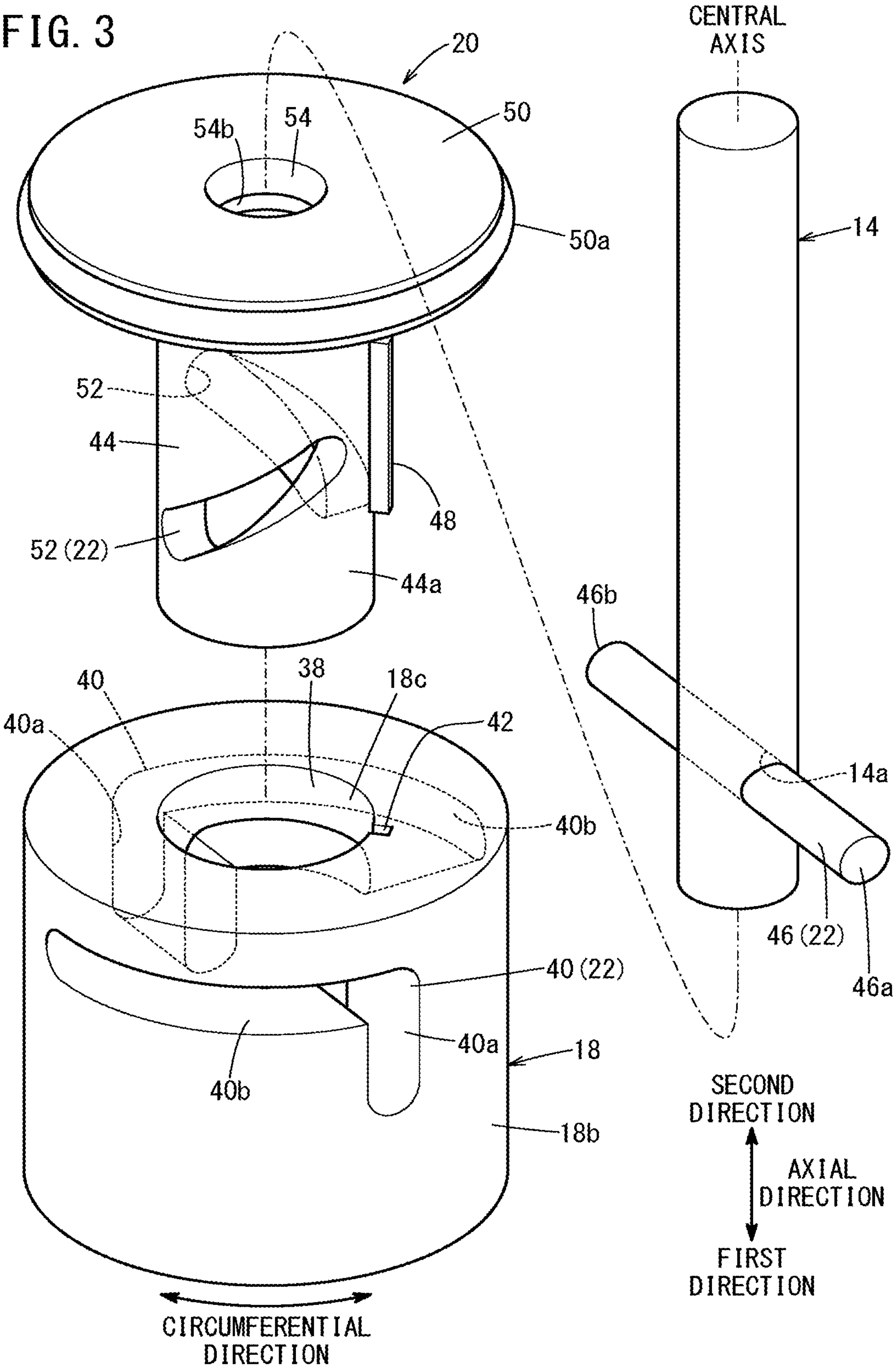
FIG. 3 is a perspective view showing in an exploded state of a piston rod, a piston member, and a guide member shown in FIG. 2.

As shown in FIG. 3, the guide member 18 has a cylindrical shape. As shown in FIG. 2 and FIG. 3, the guide member 18 includes a stop hole 18*a*, a guide hole 38, displacement switching grooves 40, and a rotation restricting groove 42. The stop hole 18*a* is positioned on the outer circumferential side of the guide member 18, and is a hole into which a set screw 36 is inserted. The stop hole 18*a* has a threaded structure, and is screwed with the set screw 36. The stop hole 18*a* and the set screw 36 serve to fix the guide member 18 to the body 12 in a manner so that it cannot be displaced in the circumferential direction and the axial direction. As shown in FIG. 1, the set screw 36 passes through a fixing hole 34 that penetrates through the side wall of the body 12, and is installed in the stop hole 18*a*.

As shown in FIG. 2, an outer circumferential surface 18*b* of the guide member 18 is in contact with an inner circumferential surface 12*a* of the body 12. The guide hole 38 penetrates through the guide member 18 in the axial direction along a central axis of the guide member 18. The guide hole 38 is surrounded by an inner circumferential surface 18*c* of the guide member 18. The guide hole 38 has a cross section perpendicular to the axial direction that is circular shaped, and extends in the axial direction while maintaining a constant inner diameter. The diameter of the guide hole 38 has a dimension that enables a shaft 44 of the piston member 20 to be inserted therethrough.

As shown in FIG. 3, the displacement switching grooves 40 constitute a part of the conversion mechanism 22, and are L-shaped grooves as viewed from the side. The displacement switching grooves 40 penetrate in the radial direction through the guide member 18 from the outer circumferential surface 18*b* to the inner circumferential surface 18*c*. The displacement switching grooves 40 have a width that enables a link pin 46 to be inserted therethrough. A pair of the displacement switching grooves 40 are disposed while sandwiching the center of the guide member 18 therebetween. The pair of displacement switching grooves 40 are disposed 180 degrees apart from each other in the circumferential direction. One end part 46*a* of the link pin 46 is inserted into one of the displacement switching grooves 40, and another end part 46*b* of the link pin 46 is inserted into the other of the displacement switching grooves 40.

Each of the displacement switching grooves 40 includes an axially directed part 40*a* that extends in the axial direction, and a circumferentially directed part 40*b* that extends in the circumferential direction. The axially directed part 40*a* is a groove that serves to guide the displacement in the axial direction of the piston rod 14. The length of the axially directed part 40*a* in the axial direction is set to be the same dimension as the length of a retraction stroke of the piston rod 14.

The circumferentially directed part 40*b* is a groove that serves to guide the rotational motion of the piston rod 14. The circumferentially directed part 40*b* extends in a circumferential direction that is perpendicular to the axial direction. In the case that the angle of the rotational motion of the piston rod 14, for example, is 90 degrees, the circumferentially directed part 40*b* extends over a range of 90 degrees in the circumferential direction. An angular range of the circumferentially directed part 40*b* is appropriately set as required.

The rotation restricting groove 42 is a groove that is formed by cutting out the inner circumferential surface 18*c* in a concave shape, and extends in the axial direction. The rotation restricting groove 42 is disposed at a position where it does not overlap in the circumferential direction with the displacement switching grooves 40. The rotation restricting groove 42 accommodates, in a displaceable manner in the axial direction, a projecting part 48 that is formed on the shaft 44 of the piston member 20. The rotation restricting groove 42, by engaging with the projecting part 48, serves to prevent the piston member 20 from being displaced in the circumferential direction.

The piston member 20 includes the piston 50, the shaft 44, helical grooves 52, and a piston hole 54. The piston 50 has a disk shape. As shown in FIG. 2, the piston 50 is accommodated in the first cylinder chamber 26. The piston 50 includes a packing 50*a* on the outer circumferential part thereof. The packing 50*a* is in contact with the inner circumferential surface 12*a* of the body 12 in a liquidtight and airtight manner. Accordingly, the piston 50 airtightly partitions the first cylinder chamber 26 into a first air chamber 26*a* on the first direction side, and a second air chamber 26*b* on the second direction side. The piston 50 causes an axial driving force to be generated due to a pressure difference between the first air chamber 26*a* and the second air chamber 26*b*. The piston member 20 is displaced in the axial direction by the driving force of the piston 50.

As shown in FIG. 3, the shaft 44 is a tubular member that extends toward the first direction from the center of the piston 50. The shaft 44 is inserted into the guide hole 38 of the guide member 18, and overlaps in the radial direction with the guide member 18. An outer circumferential surface 44*a* of the shaft 44 slides against the inner circumferential surface 18*c* of the guide member 18. The shaft 44 is guided by the guide hole 38, and is displaced in the axial direction. The projecting part 48 of the shaft 44 is a projection that projects out from the shaft 44 toward the outer circumferential side, and extends in the axial direction. The projecting part 48 is inserted into the rotation restricting groove 42 of the guide member 18, and serves to prevent the piston member 20 from being displaced in the circumferential direction with respect to the body 12.

Moreover, the shapes of the shaft 44 and the projecting part 48 are not necessarily limited to being the shapes shown in FIG. 3. The shaft 44 may have a polygonal tubular shape. In this case, since the ridge portion of the polygonal shape of the shaft 44 functions as a rotation stopper, the projecting part 48 need not necessarily be formed thereon.

The piston hole 54 is positioned in a central part in the radial direction of the piston member 20, and passes in the axial direction through the piston 50 and the shaft 44 of the piston member 20. The piston hole 54 is formed in a manner so that a cross section thereof perpendicular to the axial direction has a circular shape. An inner diameter of the piston hole 54 includes a dimension that enables the piston rod 14 to be inserted therethrough. As shown in FIG. 2, the piston hole 54 includes a packing groove 54*a*. A ring-shaped packing 54*b* is mounted in the packing groove 54*a*. The packing 54*b* seals a gap between the piston rod 14 and the piston hole 54, and serves to prevent leakage of the fluid through the piston hole 54.

As shown in FIG. 3, the helical grooves 52 are grooves that extend at an angle with respect to the axial direction, and constitute a part of the conversion mechanism 22. The helical grooves 52 convert the displacement in the axial direction of the piston member 20 into a displacement in the circumferential direction of the piston rod 14. A length of the helical grooves 52 in the axial direction, for example, can be one half the stroke length of the piston member 20. The helical grooves 52 extend over an angular range of, for example, 90 degrees in the circumferential direction. In this case, the helical grooves 52, by using one half of the displacement in the axial direction of the piston member 20, are capable of bringing about a rotational displacement of 90 degrees in the piston rod 14. Moreover, the angular range in the circumferential direction and the length in the axial direction of the helical grooves 52 are not necessarily limited to the example discussed above.

A pair of the helical grooves 52 are provided while sandwiching the center of the shaft 44 therebetween. One of the helical grooves 52 and the other of the helical grooves 52 are disposed 180 degrees apart from each other in the circumferential direction. The link pin 46 is inserted into the pair of helical grooves 52.

As shown in FIG. 3, the piston rod 14 is a cylindrical columnar member. The second direction side of the piston rod 14 projects out toward the second direction from the body 12 and the rod cover 16 as an output shaft of the cylinder device 10. The clamp arm 15, as shown in FIG. 1, is installed on the second direction side of the piston rod 14. As shown in FIG. 2, a part of the piston rod 14 on the first direction side is inserted into the piston hole 54 of the piston member 20. The piston rod 14 extends into the interior of the guide hole 38 of the guide member 18. More specifically, a part of the piston rod 14 on the first direction side overlaps in the radial direction with the piston member 20 and the guide member 18.

The piston rod 14 includes a pin hole 14*a*. The pin hole 14*a* is positioned in proximity to an end part in the first direction. The pin hole 14*a* retains the link pin 46 in the radial direction, which is orthogonal to the axial direction. The link pin 46 is displaced integrally together with the piston rod 14. The link pin 46, as noted previously, is inserted into the displacement switching grooves 40 and the helical grooves 52, and slides along the displacement switching grooves 40 and the helical grooves 52.

Figure 4B:
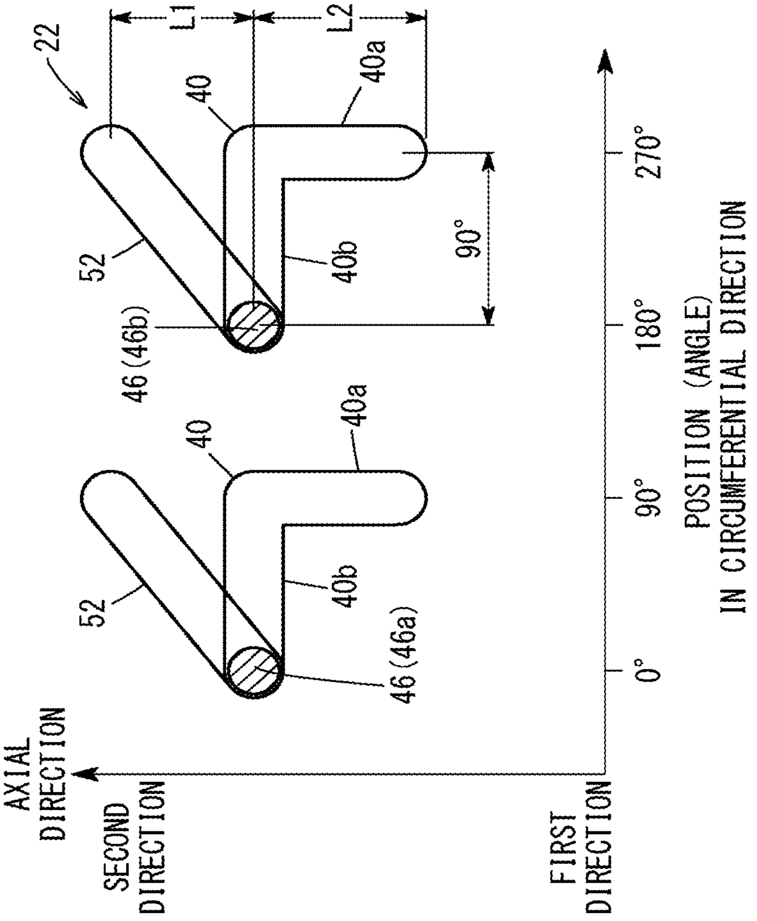
FIG. 4B is a diagram showing a positional relationship between a displacement switching groove, a helical groove, and a link pin, with a horizontal axis representing a position (an angle) in a circumferential direction of a body, and a vertical axis representing a position in an axial direction of the body.
Figure 4A:
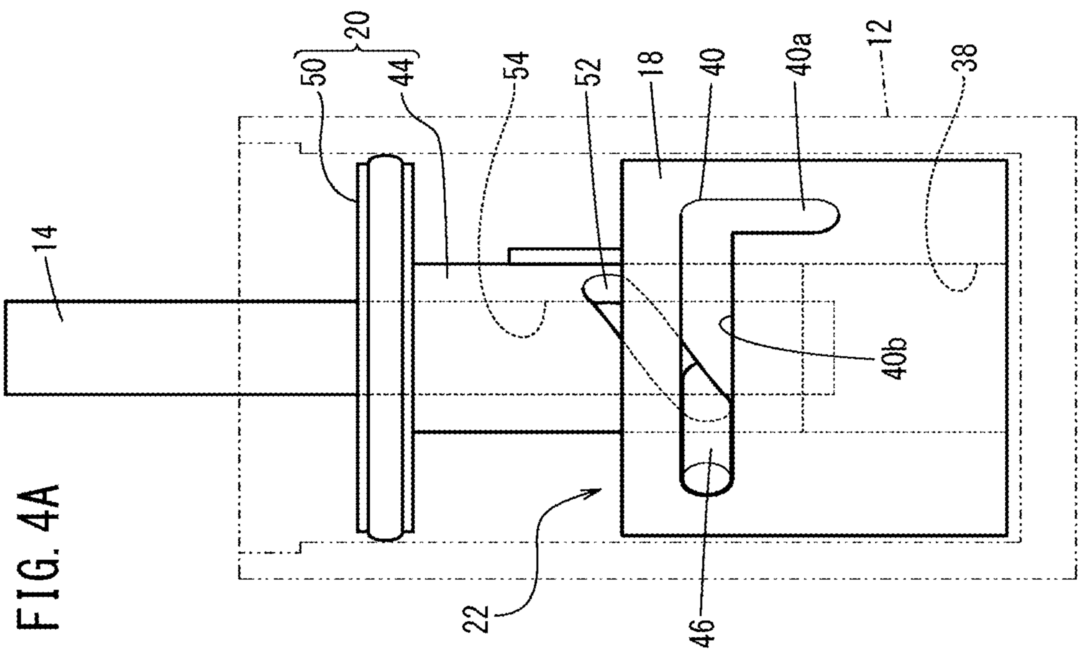
FIG. 4A is an explanatory diagram showing a positional relationship between the piston rod, the piston member, and the guide member at an extruded end of the cylinder device shown in FIG. 1.

As shown in FIG. 4A, the conversion mechanism 22 is equipped with the displacement switching grooves 40, the helical grooves 52, and the link pin 46. The piston member 20 is assembled in a manner so that a range (an angular range) in the circumferential direction of the helical grooves 52 coincides with a range (an angular range) in the circumferential direction of the circumferentially directed parts 40*b* of the displacement switching grooves 40 of the guide member 18. The link pin 46 is inserted into the helical grooves 52 and the displacement switching grooves 40.

As shown in FIG. 4B, a range (an angular range) in the circumferential direction of the helical grooves 52 coincides with an angular range of the circumferentially directed parts 40*b*. In the illustrated case, an angular range of the circumferentially directed parts 40*b* and an angular range of the helical grooves 52 are set to be 90 degrees. A range (L1) in the axial direction of the helical grooves 52 can be set, for example, to one half of the stroke length (a range of displacement in the axial direction) of the piston member 20. In this case, one half of the stroke length of the piston member 20 is used for the rotational motion of the piston rod 14. Moreover, in the aforementioned case, a length L2 of the axially directed parts 40*a* in the axial direction may be set to be one half of the stroke length of the piston member 20.

Moreover, the angular range in the circumferential direction of the helical grooves 52 may be wider than an angular range of the circumferentially directed parts 40*b*. If the range in the circumferential direction of the helical grooves 52 is wider than the angular range of the circumferentially directed parts 40*b*, the angle of rotation required for the rotational motion of the piston rod 14 can be ensured.

Further, the central position in the circumferential direction of the helical grooves 52 may coincide with the central position in the circumferential direction of the circumferentially directed parts 40*b*. Further, the central position in the circumferential direction of the helical grooves 52 may be shifted in the circumferential direction from the central position in the circumferential direction of the circumferentially directed parts 40*b*. In this case, it is sufficient if a part of each of the circumferentially directed parts 40*b* overlaps with a part of each of the helical grooves 52 in the circumferential direction. The piston rod 14 can be rotated at least within an angular range in which the circumferentially directed parts 40*b* and the helical grooves 52 overlap. Further, it is preferable for the axially directed parts 40*a* to be included within an angular range in the circumferential direction of the helical grooves 52. In accordance with such a configuration, even a single link pin 46 is capable of causing the piston rod 14 to be displaced in the axial direction.

The cylinder device 10 according to the present embodiment is constituted in the manner described above. The cylinder device 10 operates in the following manner.

FIG. 2 shows a cross section of the cylinder device 10 at the extruded end position. At the extruded end position, the piston member 20 is positioned at the extruded end (in the second direction). At the extruded end position, the link pin 46 is in the position shown in FIG. 4B with respect to the displacement switching grooves 40 and the helical grooves 52. More specifically, the one end part 46*a* of the link pin 46 is positioned at the end part of the helical groove 52 on the first direction side, and is positioned at a position of zero degrees of the circumferentially directed part 40*b*. The other end part 46*b* is positioned at a position of 180 degrees of the other circumferentially directed part 40*b*. Moreover, the angle on the horizontal axis in FIG. 4B indicates the position in the circumferential direction with the body 12 as a reference. The displacement of the cylinder device 10 toward the extruded end position is also referred to as an extrusion stroke or a return operation. The return operation is carried out by connecting the first port 28 to a pressurized fluid source, and connecting the second port 30 to an exhaust unit.

Figure 5A:
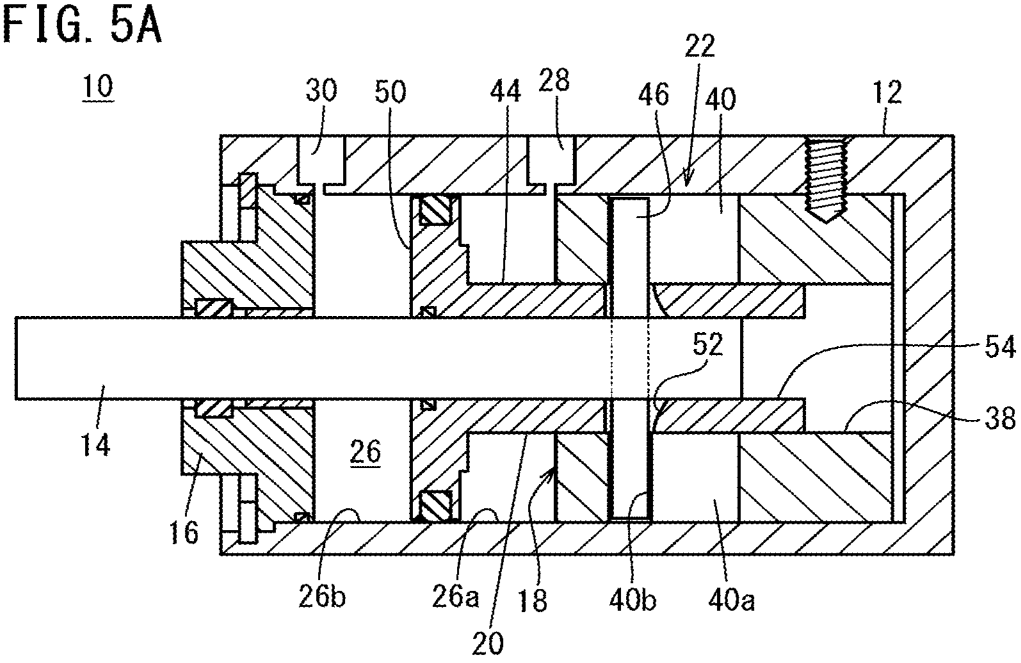
FIG. 5A is a cross-sectional view at a rotational end position of the cylinder device shown in FIG. 1.

After the return operation, the piston rod 14 of the cylinder device 10 carries out a rotational motion and a retracting motion (a clamping operation). The rotational motion of the piston rod 14 is carried out by connecting the first port 28 to the exhaust unit, and connecting the second port 30 to the pressurized fluid source. As shown in FIG. 5A, the piston 50 is displaced toward the first direction by the fluid that has flowed into the second air chamber 26*b* from the second port 30.

Figure 5B:
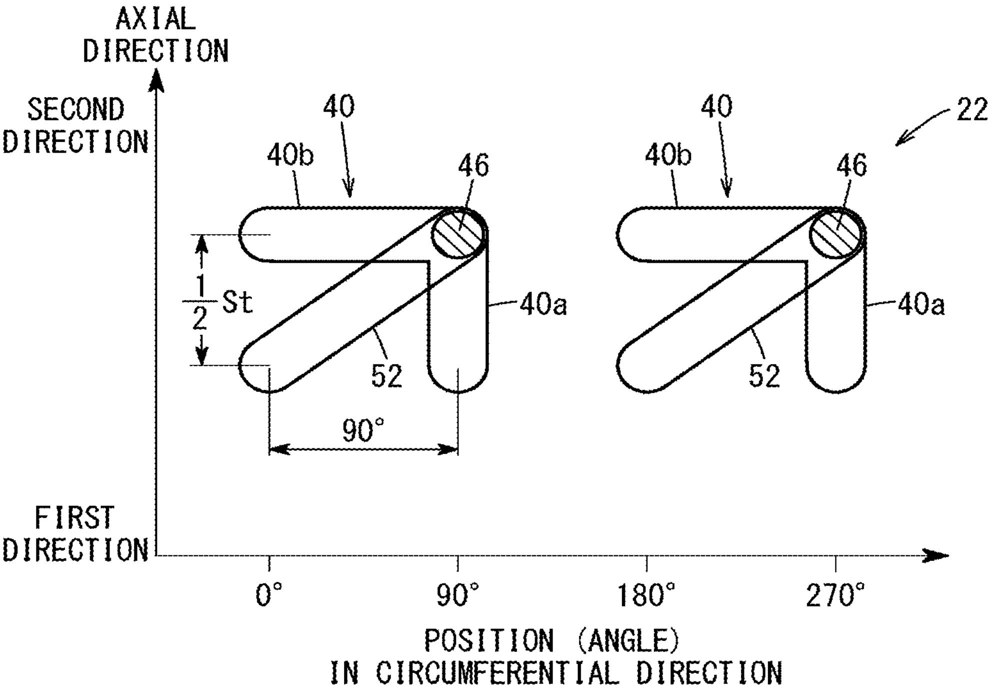
FIG. 5B is a diagram showing a positional relationship between the displacement switching groove, the helical groove, and the link pin in the state shown in FIG. 5A.

The shaft 44 is displaced in the first direction together with the piston 50. As a result, as shown in FIG. 5B, the position of the helical grooves 52 is displaced toward the first direction. The link pin 46 follows along with the movement of an intersecting portion between the helical grooves 52 and the displacement switching grooves 40, and moves in the circumferential direction along the circumferentially directed parts 40*b*. However, the circumferentially directed parts 40*b* prevent the link pin 46 from being displaced in the axial direction. Accordingly, the link pin 46 is displaced only in the circumferential direction. As a result, the piston rod 14 carries out the rotational motion in the circumferential direction while being retained at the position of the extruded end.

The rotational motion of the piston rod 14 continues until the link pin 46 is disposed at the axially directed parts 40*a*. During this time, the piston member 20 is displaced toward the first direction by one half of the distance of the retracting motion. At a rotation end position at which the rotational motion of the piston rod 14 ends, as illustrated, the link pin 46 is positioned on the other ends of the circumferentially directed parts 40*b* in the circumferential direction, and is incapable of rotating further in the circumferential direction. At the rotation end position, the link pin 46 is positioned at end parts of the helical grooves 52 in the second direction, and further, is positioned at end parts of the axially directed parts 40*a* in the second direction. In accordance therewith, the link pin 46 becomes capable of being displaced in the axial direction.

The retracting motion is carried out following the rotational motion. In the retracting motion, the piston member 20 is displaced further toward the first direction than the rotation end position.

Figure 6A:
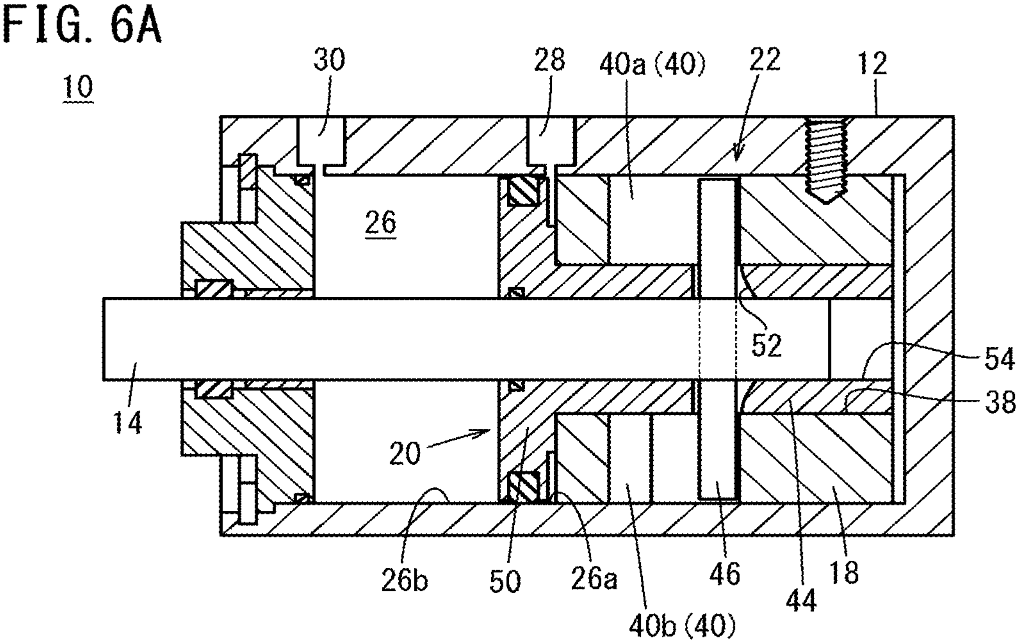
FIG. 6A is a cross-sectional view at a retracted end of the cylinder device shown in FIG. 1.
Figure 6B:
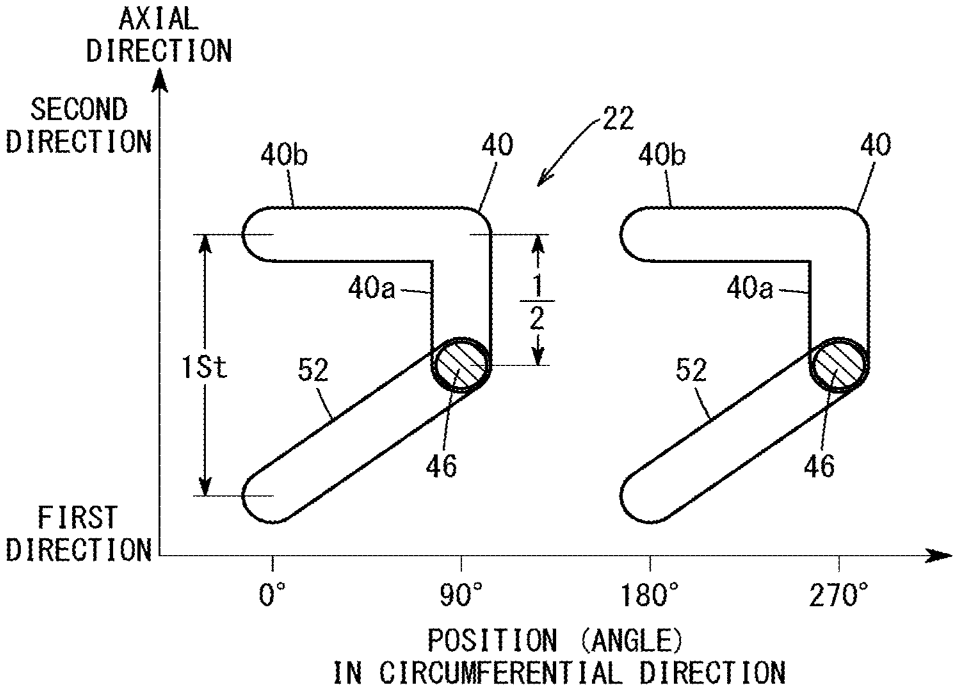
FIG. 6B is a diagram showing a positional relationship between the displacement switching groove, the helical groove, and the link pin in the state shown in FIG. 6A.

As shown in FIG. 6B, due to the displacement of the piston member 20 in the first direction, the helical grooves 52 are displaced in the first direction. The link pin 46 is displaced in the first direction together with the helical grooves 52. More specifically, the displacement in the first direction of the piston member 20 is transmitted, via the helical grooves 52 and the link pin 46, as a displacement in the axial direction of the piston rod 14 toward the first direction. As a result, the retracting motion is carried out in which the piston rod 14 is displaced linearly toward the retracted end. When the piston member 20 reaches a retracted end position at the stroke end part in the first direction, or alternatively, reaches a stopped position corresponding to the thickness of the workpiece, the retracting motion is completed. At the retracted end position, the link pin 46 is positioned at the end parts of the helical grooves 52 in the second direction, and further, is positioned at end parts of the axially directed parts 40*a* of the displacement switching grooves 40 in the first direction. The stopped position is a position at which, prior to the piston member 20 reaching the retracted end position, the piston rod 14 comes to a stop in accordance with the thickness of the workpiece and the retracting motion is completed. At the stopped position, the link pin 46 comes to a stop at predetermined positions of the axially directed parts 40*a* corresponding to the thickness of the workpiece. Due to the above-described motion, the cylinder device 10 completes the retracting motion. The return operation of the cylinder device 10 is carried out by a reverse motion of the retracting motion described above.

As noted previously, in the cylinder device 10 according to the present embodiment, the conversion mechanism 22 is formed of only one link pin 46, the helical grooves 52 that are disposed in the piston member 20, and the displacement switching grooves 40 that are disposed in the guide member 18. Since only one link pin 46 is required, and the number of grooves is reduced, the structure of the conversion mechanism 22 is simplified, and the manufacturing cost of the cylinder device 10 can be suppressed. Further, in the cylinder device 10, since the two grooves, namely, the helical groove 52 and the displacement switching groove 40 are disposed so as to overlap each other in the radial direction, compared to a conventional case in which the helical grooves 52 and the displacement switching grooves 40 are disposed alongside one another in the axial direction, the overall length can be made shorter.

Second Embodiment

Figure 7:
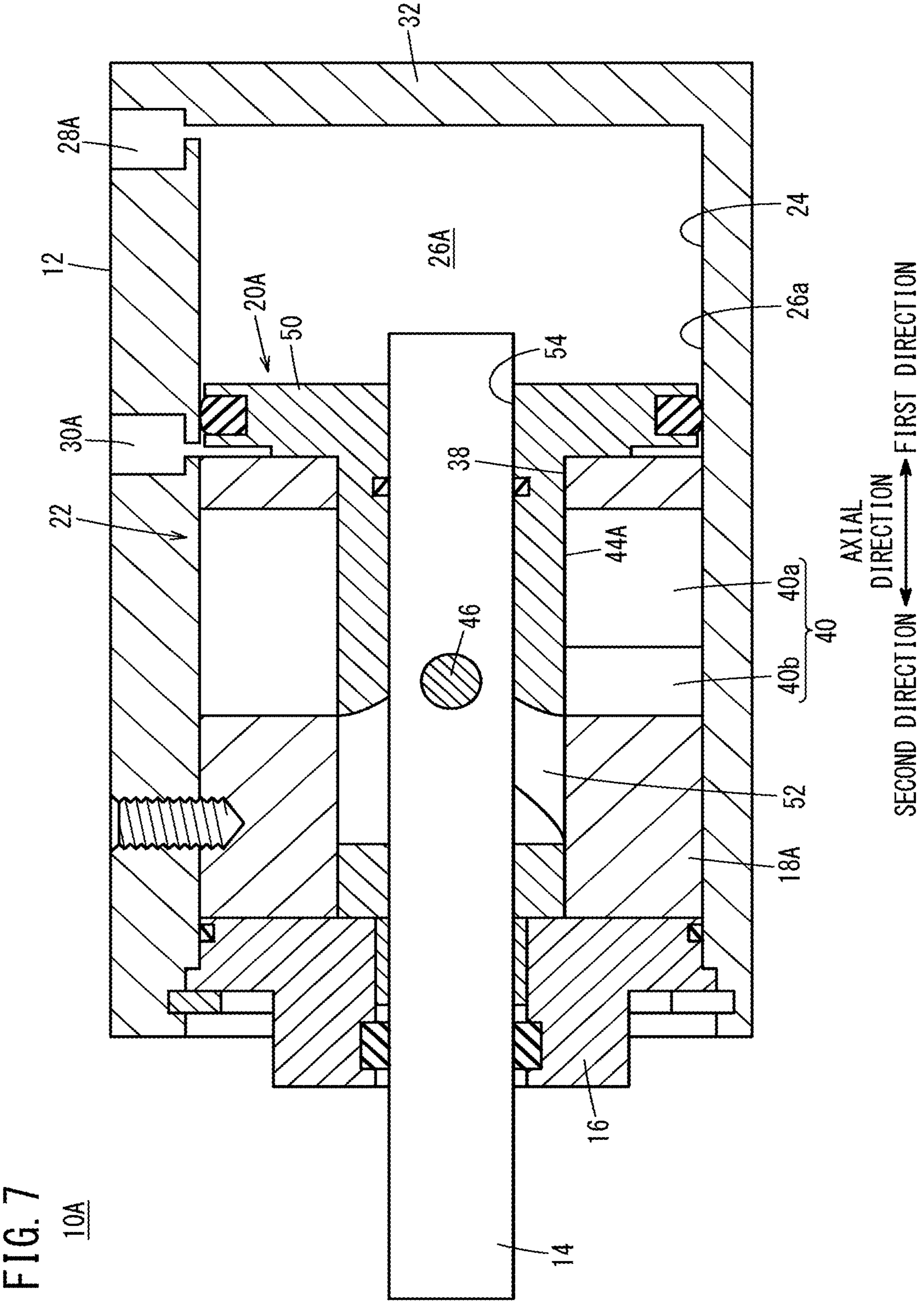
FIG. 7 is a cross-sectional view of a cylinder device according to a second embodiment.

As shown in FIG. 7, a cylinder device 10A according to the present embodiment includes the body 12, the piston rod 14, the rod cover 16, a guide member 18A, a piston member 20A, and the conversion mechanism 22. The cylinder device 10A according to the present embodiment differs from the cylinder device 10 described with reference to FIG. 1 to FIG. 6, in terms of the positional relationship in the axial direction between the guide member 18A and the piston member 20A. Moreover, in the configuration of the cylinder device 10A, the same constituent elements as those of the cylinder device 10 are denoted by the same reference numerals, and detailed description of such features will be omitted.

As illustrated, the guide member 18A is positioned on the second direction side of the cylinder hole 24, and a first cylinder chamber 26A is positioned adjacent in the first direction to the guide member 18A. The body 12 includes a first port 28A and a second port 30A for supplying the fluid to the first cylinder chamber 26A. The first port 28A opens at or in the vicinity of an end part of the first cylinder chamber 26A in the first direction. The first port 28A is positioned in close proximity to the end wall 32 of the body 12. The second port 30A opens at or in the vicinity of an end part of the first cylinder chamber 26A in the second direction. More specifically, the second port 30A is positioned in proximity to the center of the body 12 in the axial direction.

The piston member 20A includes the piston 50, a shaft 44A, and the piston hole 54. The piston 50 is disposed in the first cylinder chamber 26A. The shaft 44A is connected to the piston 50, and extends in the second direction from the piston 50. The shaft 44A is inserted into the guide hole 38 of the guide member 18A. The shaft 44A includes the projecting part 48. The projecting part 48 fixes the shaft 44A in the circumferential direction with respect to the guide member 18A and the body 12. The piston hole 54 penetrates in the axial direction through the central part of the piston member 20A.

The configuration of the piston rod 14 and the rod cover 16 is the same as that of the piston rod 14 and the rod cover 16 described with reference to FIG. 2.

Figure 8:
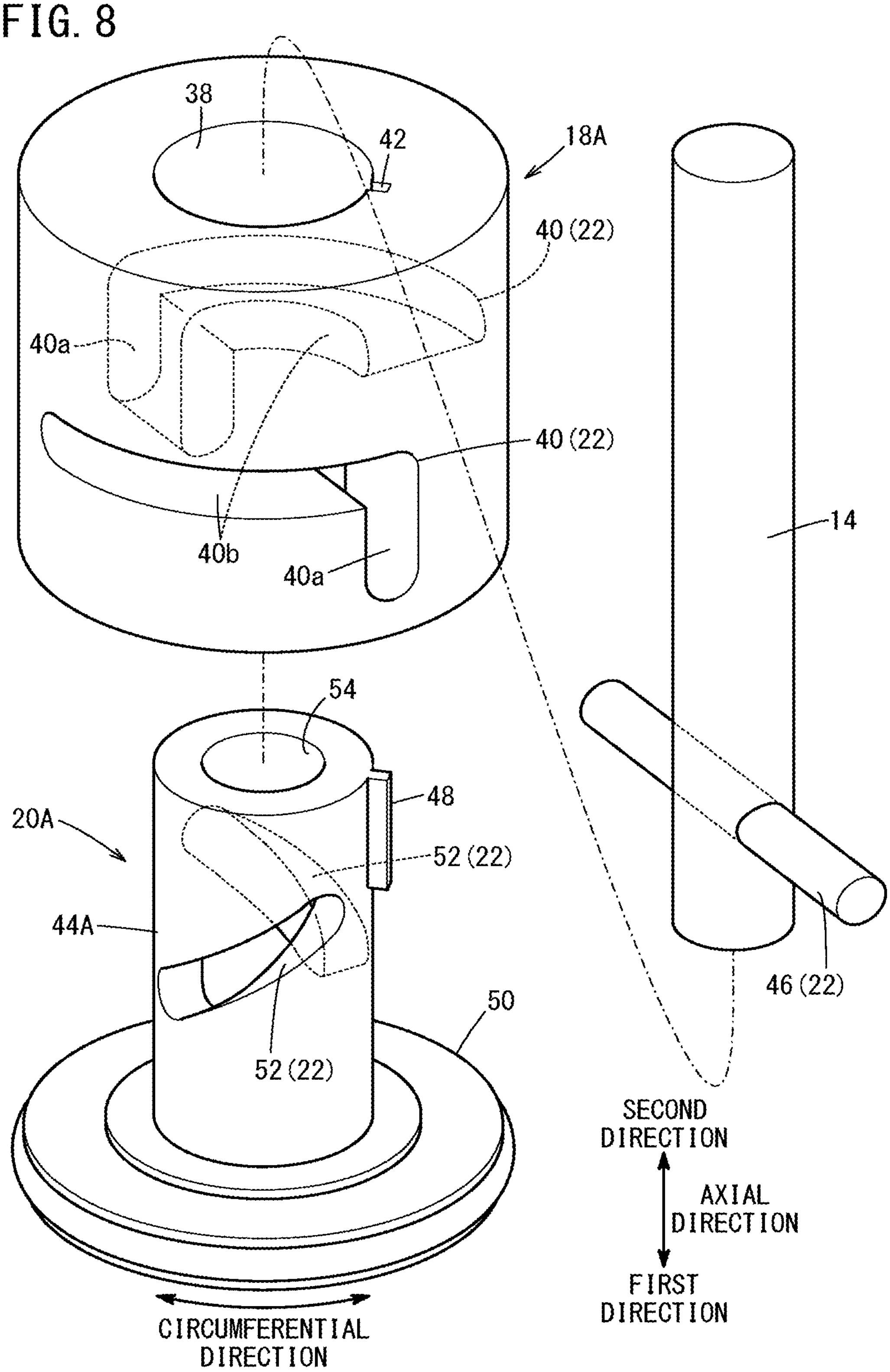
FIG. 8 is a perspective view showing in an exploded state of a piston rod, a piston member, and a guide member shown in FIG. 7.

As shown in FIG. 8, the piston rod 14 includes the link pin 46 that constitutes a part of the conversion mechanism 22. The displacement switching grooves 40 that constitute a part of the conversion mechanism 22 are formed in the guide member 18A. The helical grooves 52 that constitute a part of the conversion mechanism 22 are formed in the shaft 44A of the piston member 20A. The shapes of the displacement switching grooves 40 and the helical grooves 52, and the positional relationship therebetween are the same as those described with reference to FIG. 2 to FIG. 6. Accordingly, the conversion mechanism 22 in the cylinder device 10A according to the present embodiment is the same as the conversion mechanism 22 of the cylinder device 10.

Figure 9A:
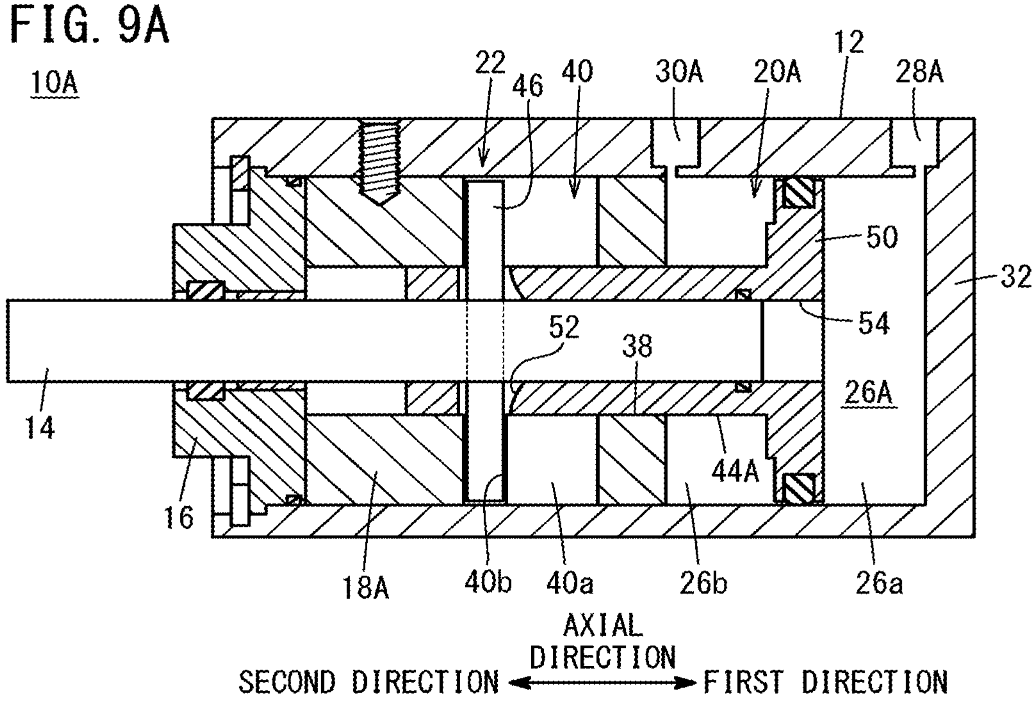
FIG. 9A is a cross-sectional view at a rotation end position of the cylinder device shown in FIG. 7.

In the cylinder device 10A, the piston rod 14 performs a rotational motion while the piston member 20A in FIG. 7 is displaced from the extruded end position to the retracted end position (or the stopped position). Until the rotation end position shown in FIG. 9A is reached, the position in the circumferential direction of the link pin 46 changes in accordance with the displacement in the axial direction of the helical grooves 52. The piston rod 14 at the rotation end position shown in FIG. 9A is displaced in the circumferential direction (rotated) by 90 degrees with respect to the piston rod 14 at the extruded end position shown in FIG. 7.

Figure 9B:
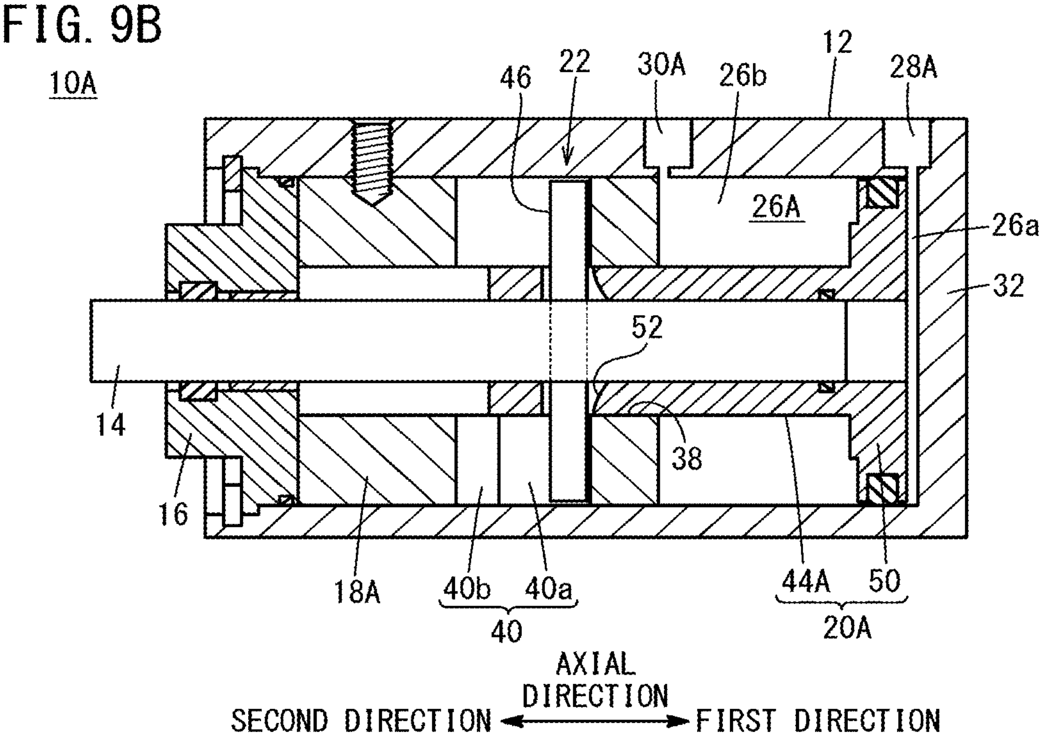
FIG. 9B is a cross-sectional view at a retracted end of the cylinder device shown in FIG. 7.

Thereafter, as shown in FIG. 9B, the cylinder device 10A performs the retracting motion to linearly retract the piston rod 14 toward the first direction. The displacement in the first direction of the piston member 20A is transmitted to the piston rod 14 via the helical grooves 52 and the link pin 46. As illustrated, the retracting motion is completed when the piston member 20A abuts against the end wall 32, or alternatively, when the link pin 46 reaches the end parts of the axially directed parts 40*a*. Moreover, in the case that the workpiece is clamped, the piston member 20A comes to a stop at a predetermined position corresponding to the thickness of the workpiece, and the retracting motion is completed.

As noted previously, in the cylinder device 10A according to the present embodiment, since the conversion mechanism 22 is capable of being constituted by one link pin 46, the cylinder device 10A is simplified, and the assembly cost thereof can be suppressed. Further, since the two grooves, namely, the helical groove 52 and the displacement switching groove 40 are disposed so as to overlap each other in the radial direction, the overall length of the cylinder device 10A can be made shorter.

Third Embodiment

Figure 10A:
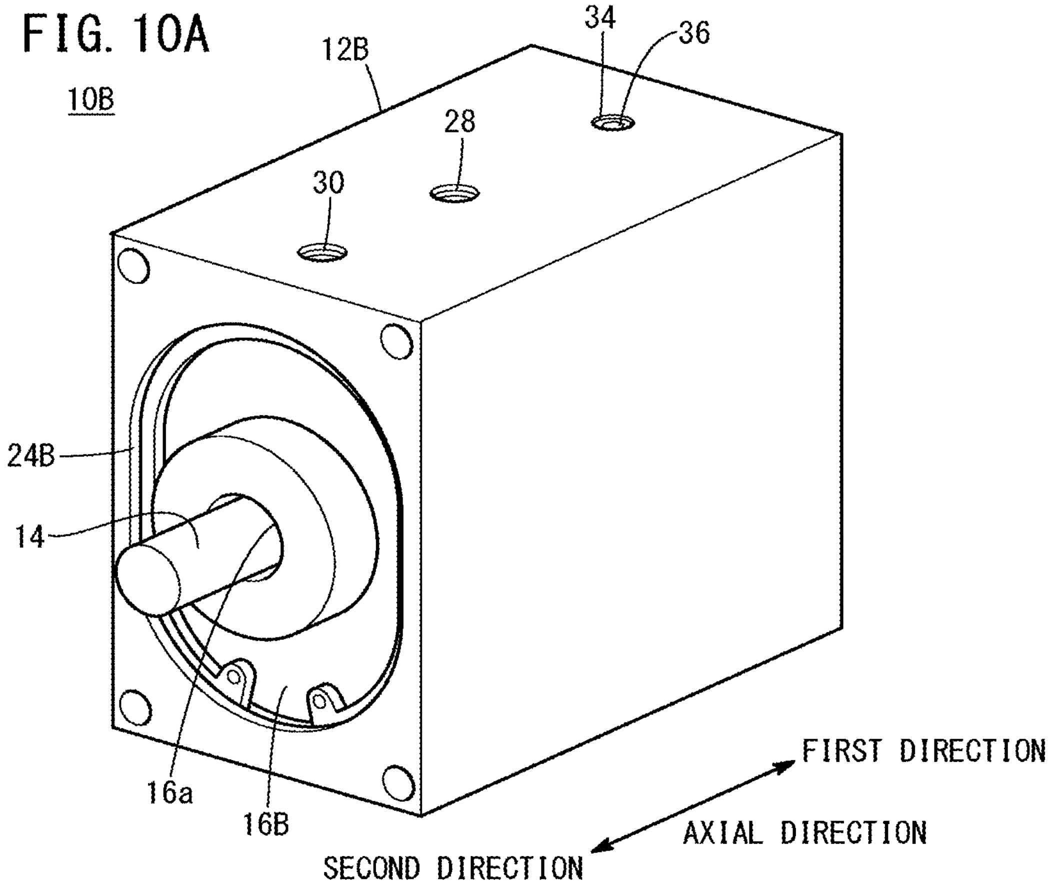
FIG. 10A is a perspective view (a transparent view) of a cylinder device according to a third embodiment.

As shown in FIG. 10A, a cylinder device 10B according to the present embodiment includes a body 12B having a rectangular shape when viewed in the axial direction. The body 12B includes a cylinder hole 24B having an elliptical shape when viewed in the axial direction. An end part of the cylinder hole 24B on the second direction side is closed by an elliptical rod cover 16B. The second port 30 is formed in close proximity to an end part of the body 12B on the second direction side, and the first port 28 is formed in close proximity to the center of the body 12B in the axial direction. The fixing hole 34 is formed in a side wall of the body 12B, in order to prevent a guide member 18B (refer to FIG. 10B) from being displaced in the axial direction. The set screw 36 is installed in the fixing hole 34.

Figure 10B:
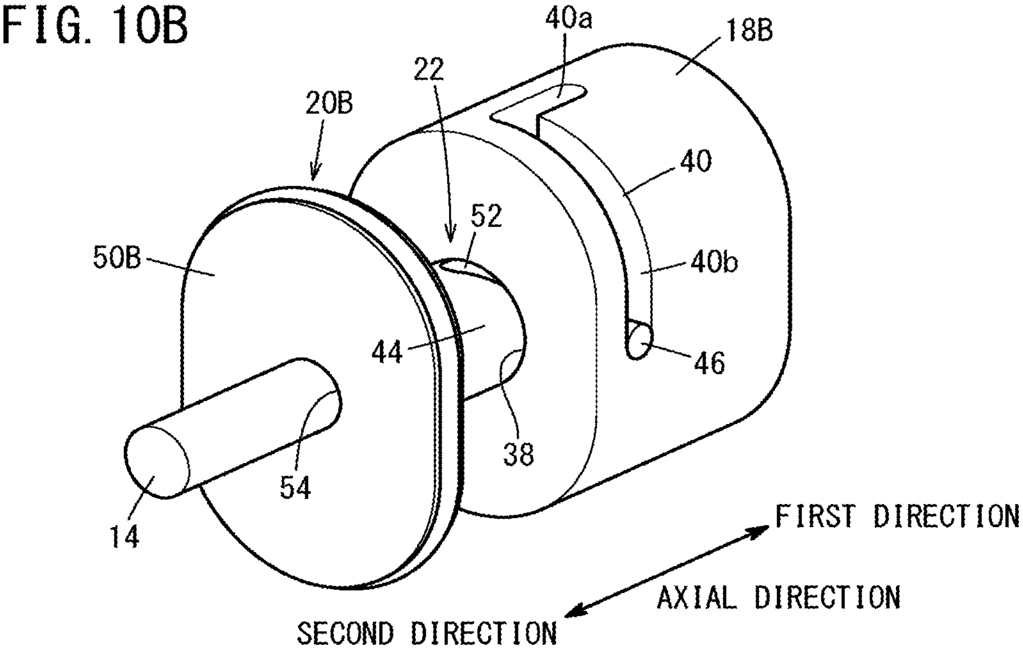
FIG. 10B is a perspective view of a piston rod, a piston member, and a guide member shown in FIG. 10A.

As shown in FIG. 10B, the piston rod 14 is inserted through the cover hole 16*a* of the rod cover 16B. The piston rod 14 includes the link pin 46. The piston rod 14 and the link pin 46 of the cylinder device 10B are constituted similarly to the piston rod 14 and the link pin 46 of the cylinder device 10 (refer to FIG. 2 and FIG. 3).

The cylinder device 10B is equipped with the guide member 18B having an elliptical shape, and a piston member 20B having an elliptical shape, when viewed in the axial direction. The guide member 18B is disposed on the first direction side of the cylinder hole 24B. The guide member 18B includes the guide hole 38 and the displacement switching grooves 40. The guide hole 38 has a circular cross-sectional shape, and is positioned at the center of the guide member 18B. The displacement switching grooves 40 have an L-shape as viewed from the side, and have the same shape as the displacement switching grooves 40 described with reference to FIG. 4B.

The piston member 20B includes a piston 50B and the shaft 44. The piston 50B has an elliptical shape, and serves to partition the cylinder hole 24B that is elliptically shaped. The shaft 44 is formed in a cylindrical shape, and is inserted into the guide hole 38 of the guide member 18B from the second direction. The helical grooves 52 are formed in the shaft 44. The shape of the helical grooves 52 is the same as that of the helical grooves 52 described with reference to FIG. 4B.

The conversion mechanism 22 according to the present embodiment is constituted by the displacement switching grooves 40, the helical grooves 52, and the link pin 46 that is inserted into the displacement switching grooves 40 and the helical grooves 52, and moves along the displacement switching grooves 40 and the helical grooves 52. The operation of the conversion mechanism 22 of the cylinder device 10B is the same as the operation of the conversion mechanism 22 of the cylinder device 10 according to the first embodiment.

According to the present embodiment, since the piston 50B of the piston member 20B is non-circular shaped, the projecting part 48 (see FIG. 3) that serves to stop the rotation of the piston member 20B, and the rotation restricting groove 42 (see FIG. 3) of the guide hole 38 become unnecessary. Since the cylinder device 10B according to the present embodiment includes the conversion mechanism 22 of a simple structure, the assembly cost thereof can be suppressed. Further, by disposing the displacement switching grooves 40 and the helical grooves 52 so as to overlap each other in the radial direction, the overall length of the cylinder device 10B can be made shorter.

Fourth Embodiment

Figure 11:
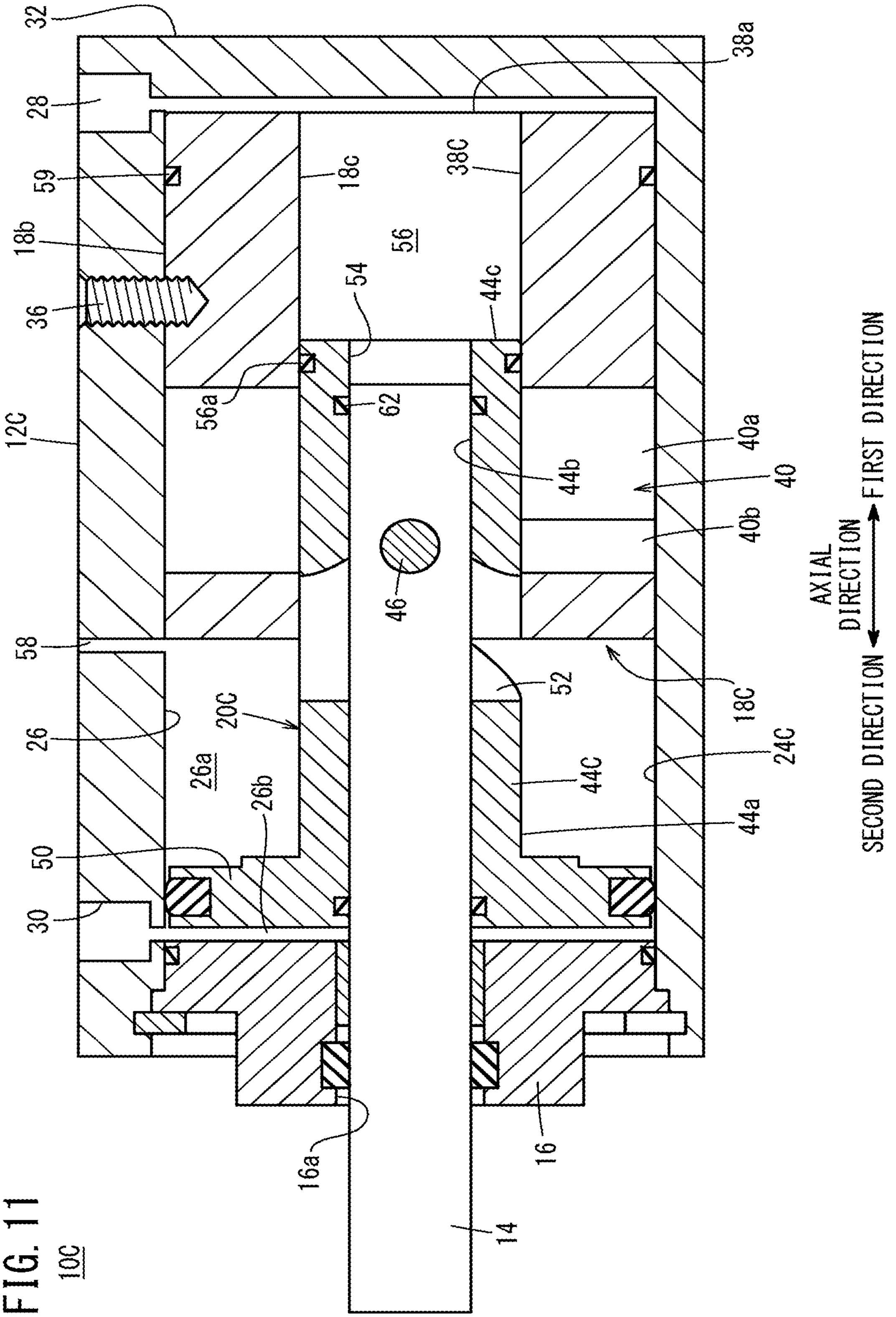
FIG. 11 is a cross-sectional view of a cylinder device according to a fourth embodiment.

As shown in FIG. 11, a cylinder device 10C according to the present embodiment includes a guide member 18C, and a piston member 20C. The guide member 18C includes the displacement switching grooves 40 that are similar to those of the guide member 18 shown in FIG. 2. The guide member 18C is positioned on the first direction side of a cylinder hole 24C, and is fixed by the set screw 36 to a body 12C so as to be incapable of being displaced in the circumferential direction and the axial direction.

The guide member 18C has an axial length that is longer than that of the guide member 18 shown in FIG. 2. Accordingly, the guide member 18C includes a guide hole 38C that is extended in the axial direction. A length L1 of the guide hole 38C from an end part 38*a* of the guide hole 38C in the first direction to the displacement switching grooves 40 is set to a dimension that is longer than the stroke length of the piston member 20C in the axial direction. The inner circumferential surface 18*c* of the guide member 18C surrounding the guide hole 38C is formed by a smooth surface. The guide member 18C includes a packing 59 on the outer circumferential surface 18*b*. The packing 59 serves to prevent leakage of the fluid along a gap between the guide member 18C and the body 12C.

A shaft 44C of the piston member 20C is extended in the axial direction. At the illustrated extruded end position, an end part 44*c* of the shaft 44C in the first direction is positioned more on the first direction side than the displacement switching grooves 40. A packing 56*a* is installed on the outer circumferential part in close proximity to the end part 44*c* of the shaft 44C in the first direction. The shaft 44C, by the packing 56*a*, closes a part of the guide hole 38C on the first direction side in a liquidtight and airtight manner.

The piston member 20C further includes an inner circumferential packing 62. The inner circumferential packing 62 is positioned on an inner circumferential surface 44*b* of the shaft 44C. The inner circumferential packing 62 serves to prevent leakage of the fluid through a gap between the piston rod 14 and the piston hole 54. The guide hole 38C on the first direction side of the shaft 44C forms a third air chamber 56 between the shaft 44C and the end wall 32. The third air chamber 56 is sealed by the packing 56*a*, the inner circumferential packing 62, and the packing 59.

The body 12C, in addition to the first port 28 and the second port 30, includes a ventilation hole 58. The first port 28 communicates with the third air chamber 56, and the second port 30 communicates with the second air chamber 26*b*. The ventilation hole 58 communicates with the first air chamber 26*a*. Since the ventilation hole 58 is open to the atmosphere, the first air chamber 26*a* is maintained at atmospheric pressure.

The other configurations of the cylinder device 10C according to the present embodiment are the same as those of the cylinder device 10 described with reference to FIG. 1 to FIG. 6B.

The cylinder device 10C according to the present embodiment is capable of returning the piston rod 14 and the piston member 20C to the extruded end position by using the fluid pressure of the third air chamber 56. Since the volume of the third air chamber 56 is smaller than the volume of the first cylinder chamber 26 (the second air chamber 26*b*), the return process of the cylinder device 10C can be carried out with a smaller amount of fluid. Accordingly, the cylinder device 10C according to the present embodiment, in comparison with the cylinder device 10 shown in FIG. 1, is capable of suppressing the amount of air consumption, and is capable of suppressing the amount of energy consumption.

Fifth Embodiment

Figure 12A:
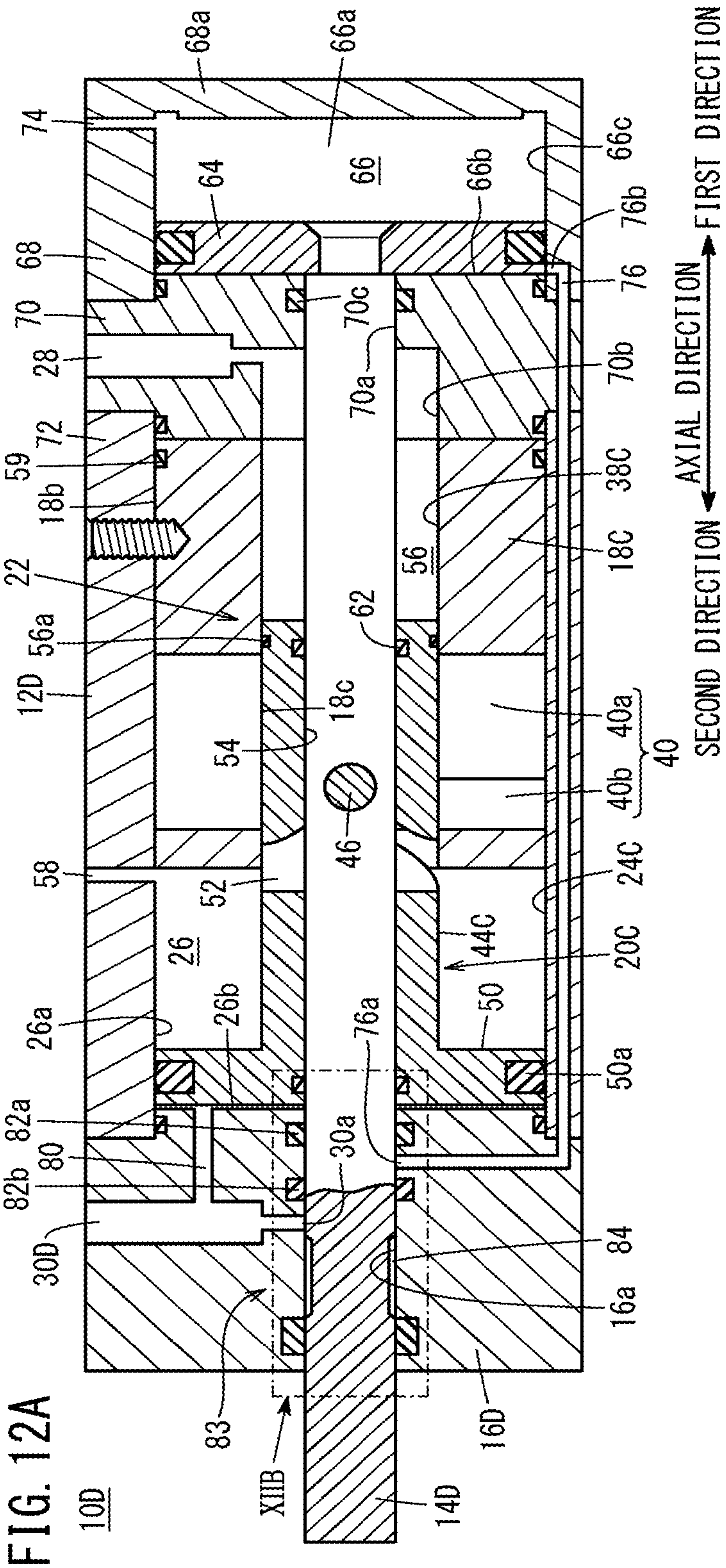
FIG. 12A is a cross-sectional view of a cylinder device according to a fifth embodiment.

As shown in FIG. 12A, a cylinder device 10D according to the present embodiment is equipped with a booster piston

64 and a booster cylinder chamber 66 which, during the retraction stroke of a piston rod 14D, cause the driving force of the piston rod 14D to increase. Moreover, in the configuration of the cylinder device 10D, the same constituent elements as those of the cylinder devices 10 to 10C described with reference to FIG. 1 to FIG. 11 are denoted by the same reference numerals, and detailed description of such features will be omitted.

The cylinder device 10D is equipped with a body 12D, the piston rod 14D, a rod cover 16D, the guide member 18C, the piston member 20C, the conversion mechanism 22, the booster piston 64, and the booster cylinder chamber 66.

The body 12D includes, from the first direction side in the axial direction, a first main body portion 68, a partition wall member 70, and a second main body portion 72. The first main body portion 68 is a tubular member including the booster cylinder chamber 66 in the interior thereof. The first main body portion 68 includes an end wall 68*a* that serves to close an end part of the booster cylinder chamber 66 on the first direction side. The partition wall member 70 is connected to the second direction side of the first main body portion 68. An end part of the booster cylinder chamber 66 on the second direction side is closed by the partition wall member 70.

The first main body portion 68 further includes a ventilation hole 74 and a booster flow path 76. The ventilation hole 74 is positioned in proximity to an end part of the first main body portion 68 in the first direction, and opens on an end part of the booster cylinder chamber 66 in the first direction. The ventilation hole 74 is open to the atmosphere, and serves to maintain the pressure of a fourth air chamber 66*a* of the booster cylinder chamber 66 on the first direction side at atmospheric pressure.

The booster flow path 76 is a flow path that extends through the interior of the first main body portion 68, the partition wall member 70, the second main body portion 72, and the rod cover 16D. An end part of the booster flow path 76 in the first direction opens into an end part of the booster cylinder chamber 66 on the second direction side. More specifically, the booster flow path 76 communicates with a fifth air chamber 66*b* of the booster cylinder chamber 66, and supplies and discharges air to and from the fifth air chamber 66*b*.

The booster piston 64 is disposed in the booster cylinder chamber 66. The booster piston 64 airtightly contacts an inner circumferential surface 66*c* of the booster cylinder chamber 66, and partitions the booster cylinder chamber 66 into the fourth air chamber 66*a* on the first direction side, and the fifth air chamber 66*b* on the second direction side. The booster piston 64 is connected to an end part of the piston rod 14D in the first direction. When a fluid is supplied to the fifth air chamber 66*b*, due to a pressure difference with the fourth air chamber 66*a*, the booster piston 64 causes a driving force to be generated toward the first direction.

The partition wall member 70 is positioned between the first main body portion 68 and the second main body portion 72. The partition wall member 70 partitions the booster cylinder chamber 66 of the first main body portion 68 from the cylinder hole 24C of the second main body portion 72. The partition wall member 70 includes a partition wall hole 70*a*, a connection hole 70*b*, and the first port 28. The partition wall hole 70*a* extends in the axial direction. The piston rod 14D is inserted through the partition wall hole 70*a* so as to be capable of being displaced in the axial direction. The partition wall hole 70*a* includes a packing 70*c*. The packing 70*c* serves to prevent leakage of fluid through the partition wall hole 70*a*.

The connection hole 70*b* is positioned adjacent in the second direction to the partition wall hole 70*a*. The connection hole 70*b* is a hole extending in the axial direction and having a circular cross section. The connection hole 70*b*, for example, has the same inner diameter as the guide hole 38C of the guide member 18C, and is connected to an end part of the guide hole 38C in the first direction. The connection hole 70*b* constitutes the third air chamber 56 together with the guide hole 38C.

The first port 28 communicates with the third air chamber 56. A pipe for supplying air is connected to the first port 28. An end part on the inner side of the first port 28 serves to supply and discharge air to and from the third air chamber 56 via the connection hole 70*b*.

The second main body portion 72 is a tubular member including the cylinder hole 24C that extends in the axial direction. The second main body portion 72 includes the ventilation hole 58. The ventilation hole 58 of the present embodiment communicates with the first air chamber 26*a*. The ventilation hole 58 is open to the atmosphere, and maintains the first air chamber 26*a* at atmospheric pressure.

The rod cover 16D is positioned on the second direction side of the second main body portion 72, and closes an end part of the cylinder hole 24C on the second direction side. The rod cover 16D includes the cover hole 16*a*, a second port 30D, a connecting flow path 80, and a part of the booster flow path 76. The cover hole 16*a* extends along a central axis of the rod cover 16D, and penetrates in the axial direction through the rod cover 16D. The cover hole 16*a* allows the piston rod 14D to be inserted therethrough so as to be capable of being displaced in the axial direction.

The second port 30D is a hole which extends in the radial direction of the rod cover 16D, and to which a pipe is capable of being connected. The second port 30D includes, on the inner side thereof, an opening 30*a* that opens at a predetermined position of the cover hole 16*a*.

The connecting flow path 80 is a flow path that extends in the axial direction. An end part of the connecting flow path 80 in the second direction communicates with the second port 30D. An end part of the connecting flow path 80 in the first direction communicates with the second air chamber 26*b* of the first cylinder chamber 26.

The booster flow path 76 extends in a bent manner in the interior of the rod cover 16D. The booster flow path 76 extends in the radial direction through the rod cover 16D, and a first end part 76*a* of the booster flow path 76 is connected to the cover hole 16*a*. A second end part 76*b* of the booster flow path 76 opens into the fifth air chamber 66*b* of the booster cylinder chamber 66. The first end part 76*a* of the booster flow path 76 is positioned further toward the first direction side than the opening 30*a* of the second port 30D.

The cover hole 16*a* includes a first packing 82*a*, and a second packing 82*b* at predetermined positions in the axial direction. The first packing 82*a* is positioned between the first cylinder chamber 26 and the first end part 76*a* of the booster flow path 76. The first packing 82*a* provides a liquidtight and airtight seal between the first cylinder chamber 26 and the booster flow path 76. The second packing 82*b* is positioned between the first end part 76*a* of the booster flow path 76 and the second port 30D. The second packing 82*b* serves to prevent leakage of the fluid through a gap between the piston rod 14D and the cover hole 16*a*.

The guide member 18C and the piston member 20C are disposed in the cylinder hole 24C. The guide member 18C and the piston member 20C of the present embodiment are constituted similarly to the guide member 18C and the piston member 20C described with reference to FIG. 11. The third air chamber 56 is formed on the first direction side of the piston member 20C. Air is supplied to and discharged from the third air chamber 56 via the first port 28. Fluid is introduced into the third air chamber 56 when the piston rod 14D and the piston member 20C are caused to return to the extruded end position. The third air chamber 56, during the return process, causes the piston member 20C and the piston rod 14D to be displaced.

The piston rod 14D is inserted through the cover hole 16*a* of the rod cover 16D. Further, the piston rod 14D is inserted through the partition wall hole 70*a* of the partition wall member 70. An end part of the piston rod 14D in the first direction is inserted into the booster cylinder chamber 66, and is connected to the booster piston 64.

The piston rod 14D, by the conversion mechanism 22 described with reference to FIG. 3 to FIG. 4B, carries out the rotational motion and the displacement in the axial direction.

Figure 12B:
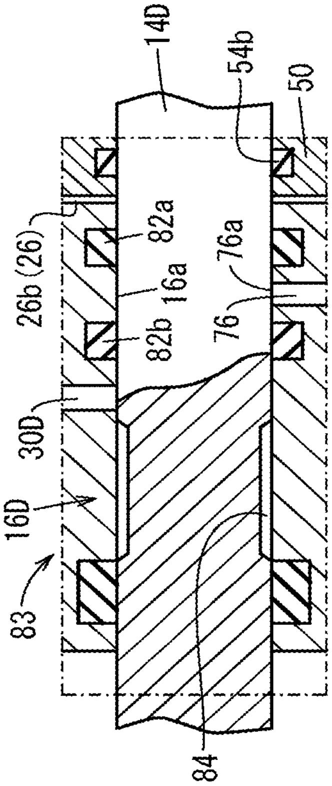
FIG. 12B is a partially enlarged cross-sectional view of a rod cover and a piston rod shown in FIG. 12A.

As shown in FIG. 12B, the piston rod 14D includes a communication groove 84 at a portion thereof inserted through the rod cover 16D. The communication groove 84, for example, is an annular groove that extends over the entire circumference in the circumferential direction of the piston rod 14D. As shown in FIG. 12A, during the period until the rotational motion of the piston rod 14D is completed from the extruded end position, the communication groove 84 is positioned more on the second direction side than the second packing 82*b*. The communication groove 84 and the second packing 82*b*, when the rotational motion of the piston rod 14D is carried out, constitute a switching valve mechanism 83 that prevents the supply of the fluid to the booster cylinder chamber 66.

The cylinder device 10D operates in the following manner.

Figure 13:
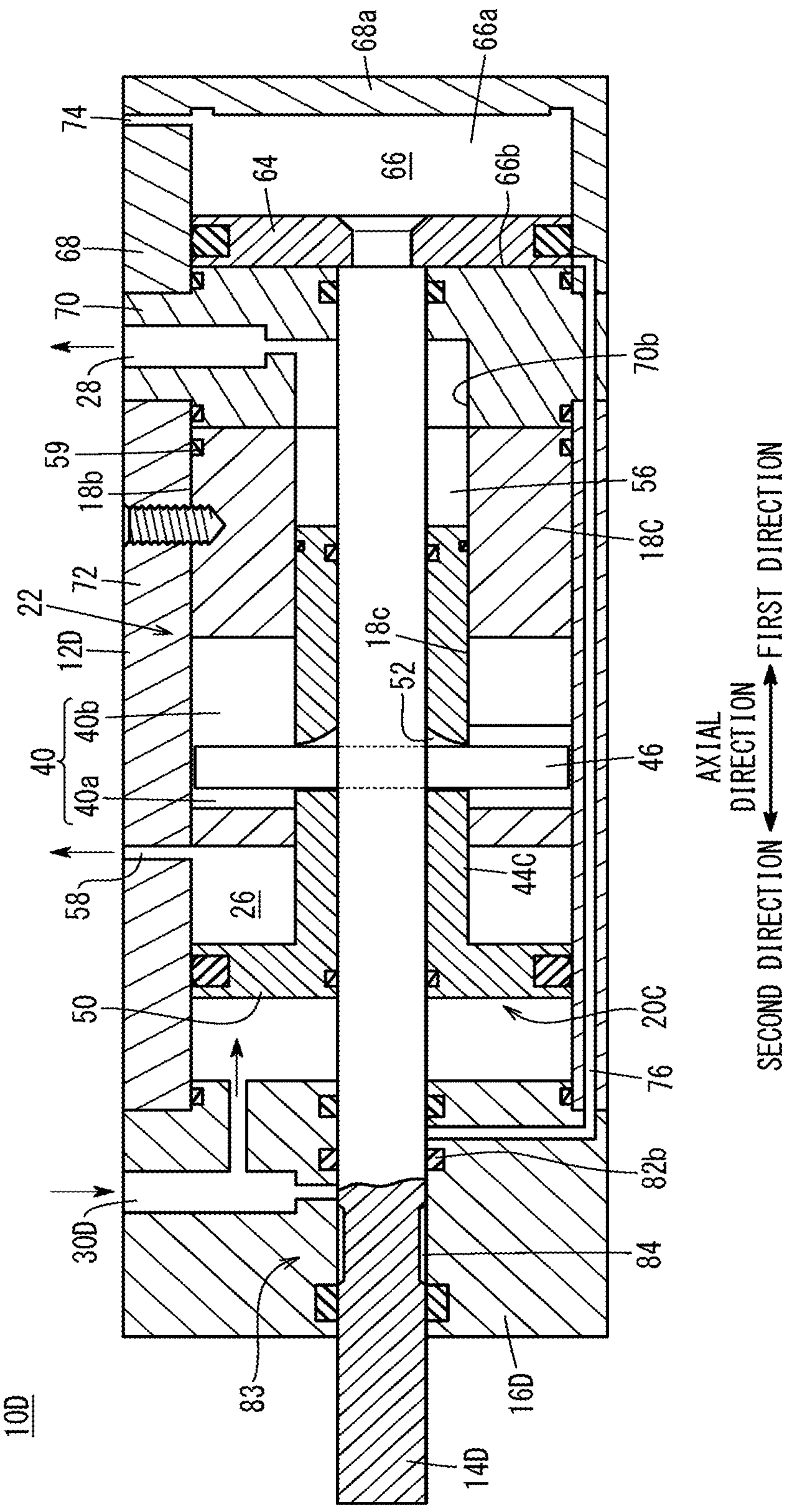
FIG. 13 is a cross-sectional view at a rotation end position of the cylinder device shown in FIG. 12A.

As shown in FIG. 13, the retraction stroke of the cylinder device 10D is carried out by supplying the fluid to the second port 30D. At this time, the exhaust unit is connected to the first port 28. As was described with reference to FIG. 12A, the piston member 20C moves in the first direction. The displacement of the piston member 20C is converted into a rotational displacement of the piston rod 14D due to the displacement of the link pin 46 along the helical grooves 52. In accordance therewith, the piston rod 14D carries out the rotational motion.

As shown in FIG. 12B, during the period until the rotational motion of the piston rod 14D is completed, the communication groove 84 is positioned more on the second direction side than the second packing 82*b*. In this case, the second port 30D and the booster flow path 76 are sealed by the second packing 82*b*. Accordingly, until the piston rod 14D carries out the displacement to be retracted in the first direction, the supply of the air to the booster cylinder chamber 66 is prevented. Therefore, in the cylinder device 10D, during the rotational motion, the booster piston 64 does not cause a driving force for boosting to be generated in the piston rod 14D. In such a cylinder device 10D, since a driving force for boosting is not applied to the conversion mechanism 22, wear and tear of the conversion mechanism 22 can be suppressed.

When the rotational motion of the piston rod 14D is completed, then as shown in FIG. 14A, the displacement in the axial direction of the piston rod 14D is initiated. When the piston rod 14D is retracted in the first direction, the communication groove 84 is displaced more toward the first direction side than the second packing 82*b*. As a result, the sealed state by the second packing 82*b* is broken, and the second port 30D and the booster flow path 76 communicate with each other through the communication groove 84. In this case, the fluid passes through the booster flow path 76 and is introduced into the fifth air chamber 66*b* of the booster cylinder chamber 66, thereby causing a driving force in the first direction to be generated by the booster piston 64. By the driving force of the booster piston 64 being added to the driving force of the piston member 20C, the driving force of the piston rod 14D increases midway through the retraction stroke.

Moreover, the extrusion stroke (the return operation) of the cylinder device 10D is carried out by supplying the fluid to the first port 28, and connecting the second port 30D to the exhaust unit. Since the volume of the third air chamber 56 is smaller than the volume of the first cylinder chamber 26 (the second air chamber 26*b*), the cylinder device 10D is capable of returning the piston rod 14D to the extruded end position with a smaller amount of fluid.

As noted previously, the cylinder device 10D of the present embodiment is capable of causing the driving force during the retraction stroke of the piston rod 14D to be increased.

Sixth Embodiment

As shown in FIG. 15A, in a cylinder device 10E according to the present embodiment, a booster piston 64E and the booster cylinder chamber 66 are positioned on the second direction side of the first cylinder chamber 26. Moreover, in the configuration of the cylinder device 10E, the same constituent elements as those of the cylinder device 10D shown in FIG. 12A are denoted by the same reference numerals, and detailed description of such features will be omitted.

The cylinder device 10E includes a body 12E, and a piston rod 14E. The body 12E includes the rod cover 16D, a first main body portion 68E (a partition wall member 70E), and a second main body portion 72E. The rod cover 16D is the same as the rod cover 16D shown in FIG. 12A. The first main body portion 68E is disposed adjacent to the first direction side of the rod cover 16D. The first main body portion 68E is positioned between the rod cover 16D and the second main body portion 72E. The first main body portion 68E includes the booster cylinder chamber 66 in the interior thereof. The booster piston 64E is disposed in the booster cylinder chamber 66.

The booster cylinder chamber 66 is partitioned by the booster piston 64E into the fourth air chamber 66*a* on the first direction side, and the fifth air chamber 66*b* on the second direction side. A booster flow path 76E communicates with the fifth air chamber 66*b*. A ventilation hole 67 communicates with the fourth air chamber 66*a*. The ventilation hole 67 maintains the fourth air chamber 66*a* at atmospheric pressure. The first direction side of the booster cylinder chamber 66 (the fourth air chamber 66*a*) is closed by the partition wall member 70E. The partition wall member 70E is integrally connected, for example, to the first main body portion 68E.

The partition wall member 70E is positioned at a connected portion between the first main body portion 68E and the second main body portion 72E. The partition wall member 70E serves to separate, in a liquidtight and airtight manner, the booster cylinder chamber 66 of the first main body portion 68E from the first cylinder chamber 26 of the second main body portion 72E. The partition wall member 70E includes, in the center thereof, the partition wall hole 70*a* through which the piston rod 14E is inserted.

The second main body portion 72E has a tubular shape in which an end part thereof in the first direction is closed by the end wall 68*a*. The second main body portion 72E includes the cylinder hole 24C in the interior thereof. The first direction side of the cylinder hole 24C is closed by the end wall 68*a*, and the second direction side of the cylinder hole 24C is closed by the partition wall member 70E. The guide member 18C is disposed in the cylinder hole 24C. The guide member 18C is disposed in the cylinder hole 24C on the first direction side. The first cylinder chamber 26 is formed between the partition wall member 70E and the guide member 18C.

The piston 50 of the piston member 20C is disposed in the first cylinder chamber 26. The first cylinder chamber 26 is partitioned by the piston 50 into the first air chamber 26*a* and the second air chamber 26*b*. The first air chamber 26*a* communicates with the ventilation hole 58, and is maintained at atmospheric pressure. The second air chamber 26*b* communicates via a connecting flow path 80E with the second port 30D. The connecting flow path 80E is formed in the interior of the second main body portion 72E, the first main body portion 68E, and the rod cover 16D.

The third air chamber 56 is formed in the interior of the guide hole 38C of the guide member 18C. The third air chamber 56 communicates with the first port 28.

The piston rod 14E includes a first rod portion 14*b*, and a second rod portion 14*c*. The first rod portion 14*b* is connected to the first direction side of the booster piston 64E. The first rod portion 14*b* extends toward the first direction from the booster piston 64E. The second rod portion 14*c* is connected to the second direction side of the booster piston 64E. The second rod portion 14*c* extends toward the second direction from the booster piston 64E.

The second rod portion 14*c* is inserted through the cover hole 16*a*. The second rod portion 14*c* includes the communication groove 84. The rod cover 16D is the same as the rod cover 16D shown in FIG. 12A.

The cylinder device 10E according to the present embodiment is constituted in the manner described above. In the cylinder device 10E shown in FIG. 15A, when the fluid is supplied to the second port 30D and the first port 28 is connected to the exhaust unit, the piston member 20C initiates the retraction stroke. The conversion mechanism 22 converts the displacement of the piston member 20C toward the first direction into a rotational displacement of the piston rod 14E. As a result, until reaching the rotation end position shown in FIG. 15B, the piston rod 14E carries out the rotational motion at the extruded end position.

The piston member 20C is further displaced in the first direction from the rotation end position shown in FIG. 15B. As a result, the conversion mechanism 22 transmits the displacement in the first direction of the piston member 20C directly to the piston rod 14E. The piston rod 14E is displaced toward the first direction together with the piston member 20C. When the piston rod 14E moves a predetermined distance in the first direction, the communication groove 84 climbs over the second packing 82*b*.

As a result, as shown in FIG. 16, the second port 30D and the booster flow path 76E communicate with each other via the communication groove 84. The fluid in the second port 30D flows through the communication groove 84 and the booster flow path 76E into the booster cylinder chamber 66 (the fifth air chamber 66*b*), and thereby causing a driving force to be generated in the booster piston 64E. In the piston rod 14E, the driving force of the booster piston 64E is added to the driving force of the piston member 20C.

As noted previously, the cylinder device 10E of the present embodiment also provides the same effects and advantages as those of the cylinder device 10D.

Seventh Embodiment

As shown in FIG. 17, a cylinder device 10F according to the present embodiment is equipped with the body 12, a piston rod 14F, the rod cover 16, a guide member 18F, a piston member 20F, and a conversion mechanism 22F. Moreover, in the cylinder device 10F, the same constituent elements as those of the cylinder device 10A shown in FIG. 7 are denoted by the same reference numerals, and detailed description of such features will be omitted.

The body 12 includes the cylinder hole 24 that extends in the axial direction. The body 12 includes, in the cylinder hole 24, the first cylinder chamber 26 on the first direction side, and the guide member 18F on the second direction side. The piston 50 of the piston member 20F is disposed in the first cylinder chamber 26. The first cylinder chamber 26 is partitioned by the piston 50 into the first air chamber 26*a* on the first direction side, and the second air chamber 26*b* on the second direction side. The body 12 includes the first port 28A that communicates with the first air chamber 26*a*, and the second port 30A that communicates with the second air chamber 26*b*.

The piston rod 14F extends in the axial direction along a central axis of the cylinder device 10F. A part of the piston rod 14F in the second direction is inserted through the cover hole 16*a* of the rod cover 16, and projects out to the outer side of the rod cover 16 (to the second direction side). A part of the piston rod 14F in the first direction is accommodated in the guide hole 38 of the guide member 18F. An outer circumferential surface 14*d* of the piston rod 14F slides against the inner circumferential surface 18*c* of the guide member 18F. The piston rod 14F is supported by the guide member 18F so as to be capable of moving in the axial direction.

As shown in FIG. 18, the piston rod 14F includes the pin hole 14*a* and a rod hole 86. The rod hole 86 is positioned on the first direction side of the piston rod 14F, and extends in the axial direction along the center of the piston rod 14F. An end part of the rod hole 86 in the first direction is open. The rod hole 86 accommodates a shaft 44F of the piston member 20F in a manner so that it is capable of sliding in the axial direction. In the rod hole 86, the piston rod 14F overlaps from the outer side in the radial direction with the shaft 44F of the piston member 20F.

The pin hole 14*a* penetrates in the radial direction through the piston rod 14F. The pin hole 14*a* is disposed at a position where it overlaps with the rod hole 86. The link pin 46 is inserted through the pin hole 14*a*.

The guide member 18F is disposed adjacent to the rod cover 16. The guide member 18F is a tubular member, and includes the guide hole 38 and the displacement switching grooves 40. The guide hole 38 penetrates in the axial direction through the center of the guide member 18F. The guide hole 38 accommodates the piston rod 14F in a manner so that it is capable of sliding in the axial direction and the circumferential direction. The displacement switching grooves 40 are the same as the displacement switching grooves 40 described with reference to FIG. 3, and each include the axially directed part 40*a* that extends in the axial direction, and the circumferentially directed part 40*b* that extends in the circumferential direction. The link pin 46 is inserted into the displacement switching grooves 40. The guide member 18F is fixed to the body 12 by the set screw 36, so as to be incapable of being displaced in the axial direction and the circumferential direction.

The piston member 20F includes the piston 50, and the shaft 44F. The piston 50 is disposed in the first cylinder chamber 26, and moves in the axial direction within the first cylinder chamber 26. The shaft 44F is connected to the center of the piston 50, and extends in the axial direction toward the second direction from the piston 50. The shaft 44F is accommodated in the rod hole 86 of the piston rod 14F. The shaft 44F includes the helical grooves 52 that extend at an angle with respect to the axial direction. The link pin 46 is inserted into the helical grooves 52. The piston member 20F is connected via the link pin 46 to the piston rod 14F. The piston member 20F is installed so as to be incapable of rotating in the circumferential direction with respect to the body 12 by a non-illustrated rotation stopping member. The piston member 20F is displaced in the axial direction within a stroke range of the piston 50.

The conversion mechanism 22F is constituted by the helical grooves 52 of the piston member 20F, the link pin 46 of the piston rod 14F, and the displacement switching grooves 40 of the guide member 18F. In the conversion mechanism 22F, the positional relationship in the circumferential direction between the displacement switching grooves 40, the helical grooves 52, and the link pin 46 is as described with reference to FIG. 4B.

The conversion mechanism 22F differs from the conversion mechanism 22 shown in FIG. 8, in that the shaft 44F is disposed on the inner circumferential side, and the piston rod 14F is disposed on the outer circumferential side. The operation of the conversion mechanism 22F is the same as that of the conversion mechanism 22. More specifically, the conversion mechanism 22F converts a portion of the displacement in the axial direction of the piston member 20F into a rotational displacement of the piston rod 14F, and transmits a remaining displacement in the axial direction of the piston member 20F as a displacement in the axial direction of the piston rod 14F.

The cylinder device 10F according to the present embodiment exhibits the same effects and advantages as those of the cylinder device 10 shown in FIG. 1.

Eighth Embodiment

As shown in FIG. 19 and FIG. 20, a cylinder device 10G according to the present embodiment is equipped with the body 12B, a piston rod 14G, the rod cover 16, a guide member 18G, a piston member 20G, and a conversion mechanism 22G. Moreover, in the cylinder device 10G according to the present embodiment, the same constituent elements as those of the cylinder device 10B shown in FIG. 10A are denoted by the same reference numerals, and detailed description of such features will be omitted.

In the cylinder device 10G according to the present embodiment, the piston rod 14G is positioned on the innermost side in the radial direction. The piston rod 14G is capable of being displaced in the axial direction and the circumferential direction with respect to the body 12B. As shown in FIG. 20, the piston rod 14G includes the link pin 46. The link pin 46 connects the piston rod 14G and the piston member 20G.

The guide member 18G is positioned between the piston rod 14G and the piston member 20G in the radial direction. The guide member 18G is formed in a cylindrical shape, and includes the guide hole 38 in the interior thereof. The piston rod 14G is disposed in the guide hole 38 so as to be capable of sliding in the axial direction. The guide member 18G has an end in the axial direction that is joined to the end wall 32, and is fixed so as to be incapable of being displaced in the axial direction and the circumferential direction with respect to the body 12B. The guide member 18G is disposed in the interior of a piston hole 88 of the piston member 20G. The guide member 18G includes the displacement switching grooves 40 having an L-shape. The link pin 46 is inserted through the displacement switching grooves 40. The link pin 46 slides along the displacement switching grooves 40.

In a cylinder hole 24G, a first cylinder chamber 26G is formed between the guide member 18G and the body 12B. The piston member 20G is positioned on the outer circumferential side of the guide member 18G. The piston member 20G has a non-circular shaped (elliptical shaped) cross section, and is displaced in the axial direction while closing the cylinder hole 24G also having a non-circular shaped (elliptical shaped) cross section. The piston member 20G is disposed in the first cylinder chamber 26G. An outer circumferential surface 20*a* of the piston member 20G slidably abuts against the inner circumferential surface 12*a* of the body 12B. The piston member 20G includes the piston hole 88 through which the guide member 18G passes. An inner circumferential surface 20*b* of the piston hole 88 of the piston member 20G slides against the guide member 18G.

The piston member 20G includes packings 90 respectively on both of the outer circumferential surface 20*a* and the inner circumferential surface 20*b*. The piston member 20G including the packings 90 partitions the first cylinder chamber 26G into the first air chamber 26*a* and the second air chamber 26*b*. The first air chamber 26*a* communicates with the first port 28, and the second air chamber 26*b* communicates with the second port 30. The piston member 20G is displaced in the axial direction due to a pressure difference between the first air chamber 26*a* and the second air chamber 26*b*. The piston member 20G includes the helical grooves 52 that are inclined with respect to the axial direction. The link pin 46 is inserted into the helical grooves 52, and slides along the helical grooves 52. Since the piston member 20G is non-circular shaped, it is incapable of being displaced in the circumferential direction with respect to the body 12B, but is capable of being displaced in the axial direction.

The conversion mechanism 22G is constituted by the helical grooves 52 that are positioned on the outer side in the radial direction, the displacement switching grooves 40 that are positioned in the middle in the radial direction, and the link pin 46 that is extended out from the piston rod 14G that is on the inner side in the radial direction. In the conversion mechanism 22G according to the present embodiment, the positional relationship between the link pin 46, the helical grooves 52, and the displacement switching grooves 40 is the same as that of the positional relationship described with reference to FIG. 4B.

The cylinder device 10G according to the present embodiment exhibits the same effects and advantages as those of the cylinder device 10 shown in FIG. 1.

Ninth Embodiment

As shown in FIG. 21 and FIG. 22, a cylinder device 10H according to the present embodiment is similar to the cylinder device 10G shown in FIG. 19, but differs from the cylinder device 10G in terms of the positional relationship in the radial direction between a piston rod 14H and a guide member 18H. Moreover, in the cylinder device 10H, the same constituent elements as those of the cylinder device 10G are denoted by the same reference numerals, and detailed description of such features will be omitted.

As shown in FIG. 21 and FIG. 22, in the cylinder device 10H, the piston member 20G is positioned on the outer circumference in the radial direction, the piston rod 14H is positioned in the middle in the radial direction, and the guide member 18H is positioned on the inner side in the radial direction. The piston rod 14H includes a rod hole 94 in which the guide member 18H is accommodated. The piston rod 14H includes a packing 92 on an inner circumferential surface 94*a* of the rod hole 94. The packing 92 serves to prevent leakage of air along a gap between the piston rod 14H and the guide member 18H.

The guide member 18H is positioned on the inner circumferential side of the piston rod 14H. The guide member 18H includes the displacement switching grooves 40 having an L-shape. The displacement switching grooves 40 serve to guide the movement of the link pin 46 that is supported on the piston rod 14H. The guide member 18H is, at an end part thereof in the first direction, joined to the end wall 32 of the body 12B. Accordingly, the guide member 18H is fixed so as to be incapable of being displaced in the axial direction and the circumferential direction with respect to the body 12B.

The piston member 20G includes an elliptical cross-sectional shape that is similar to that of the piston member 20G described with reference to FIG. 20. The piston member 20G is incapable of rotating with respect to the body 12B. The piston member 20G includes the helical grooves 52 that serve to guide the link pin 46.

A conversion mechanism 22H according to the present embodiment is constituted by the helical grooves 52 that are positioned on the outer circumferential side in the radial direction, the piston rod 14H and the link pin 46 that are positioned in the middle in the radial direction, and the displacement switching grooves 40 that are positioned on the inner circumferential side in the radial direction. The positional relationship in the axial direction and the circumferential direction between the link pin 46, the helical grooves 52, and the displacement switching grooves 40 is the same as that shown in FIG. 4B.

The cylinder device 10H according to the present embodiment exhibits the same effects and advantages as those of the cylinder device 10 shown in FIG. 1.

Tenth Embodiment

As shown in FIG. 23 and FIG. 24, a cylinder device 10I according to the present embodiment is equipped with the body 12, the piston rod 14I, a guide member 18I, a piston member 201, and a conversion mechanism 22I. Moreover, in the cylinder device 10I according to the present embodiment, the same constituent elements as those of the cylinder device 10 shown in FIG. 1 are denoted by the same reference numerals, and detailed description of such features will be omitted.

The piston rod 14I is disposed outside the body 12, and is supported by the guide member 18I. The piston rod 14I includes a rod hole 98, and the pin hole 14*a*. The rod hole 98 is a hole having a circular cross sectional shape, is positioned in the center of the piston rod 14I, and extends in the axial direction, and an end part thereof in the first direction is open. The rod hole 98 accommodates the guide member 18I. The piston rod 14I slides in the axial direction and the radial direction with respect to the guide member 18I through the rod hole 98. The link pin 46 is installed in the pin hole 14*a* in a manner so as to penetrate therethrough in the radial direction. The link pin 46 slides along the displacement switching grooves 40 of the guide member 18I.

The guide member 18I is a cylindrical member, and is positioned on the inner circumferential side of the piston rod 14I. The guide member 18I includes the displacement switching grooves 40 having an L-shape. Further, the guide member 18I includes the guide hole 38 that extends in the axial direction at the center thereof. The guide hole 38 penetrates in the axial direction through the guide member 18I. The guide hole 38 accommodates a shaft 44I of the piston member 201. An end part of the guide member 18I in the first direction is fixed to the rod cover 16. Accordingly, the guide member 18I is fixed so as to be incapable of being displaced in the axial direction and the circumferential direction with respect to the body 12. A packing 100 is installed in the guide hole 38 of the guide member 18I. The packing 100 serves to prevent leakage of the fluid through a gap between the shaft 441 and the guide hole 38.

The piston member 201 includes the piston 50, and the shaft 44I. The piston 50 is disposed in the cylinder hole 24 in the interior of the body 12. The piston 50 partitions the first cylinder chamber 26 that is formed in the cylinder hole 24 into the first air chamber 26*a*, and the second air chamber 26*b*. The piston 50 is displaced in the axial direction due to a pressure difference between the first air chamber 26*a* and the second air chamber 26*b*. The shaft 44I extends in the second direction from the center of the piston 50. The shaft 44I is inserted into the guide hole 38 of the guide member 18I, and is displaced in the axial direction in the interior of the guide member 18I. The piston member 201 includes, on the shaft 44I, a rotation stopping projection 97 for preventing displacement in the circumferential direction. The rotation stopping projection 97 restricts the rotation of the piston member 201, by engaging with a non-illustrated rotation stopping groove that is provided on the guide hole 38 of the guide member 18I. More specifically, the shaft 44I is incapable of rotating in the circumferential direction with respect to the body 12. The shaft 44I includes the helical grooves 52 that are inclined with respect to the axial direction. The helical grooves 52 are positioned more on the second direction side than the rod cover 16. The link pin 46 is inserted into the helical grooves 52.

The conversion mechanism 22I of the present embodiment is positioned outside the rod cover 16. The conversion mechanism 22I is constituted by the displacement switching grooves 40, the helical grooves 52, and the piston rod 14I including the link pin 46. In the conversion mechanism 22I, the piston rod 14I is positioned on the outer circumferential side in the radial direction, the displacement switching grooves 40 are positioned in the middle in the radial direction, and the helical grooves 52 are positioned on the innermost side in the radial direction. The positional relationship in the axial direction and the circumferential direction between the link pin 46, the displacement switching grooves 40, and the helical grooves 52 is the same as that shown in FIG. 4B.

The cylinder device 10I according to the present embodiment exhibits the same effects and advantages as those of the cylinder device 10 shown in FIG. 1.

Eleventh Embodiment

As shown in FIG. 25 and FIG. 26, a cylinder device 10J according to the present embodiment is similar to the cylinder device 10I shown in FIG. 23, but differs from the cylinder device 10I in terms of the positional relationship between a piston member 20J and a guide member 18J. Moreover, in the cylinder device 10J according to the present embodiment, the same constituent elements as those of the cylinder device 10I shown in FIG. 23 are denoted by the same reference numerals, and detailed description of such features will be omitted.

The piston rod 14I is constituted similarly to the piston rod 14I shown in FIG. 23. Moreover, a shaft 44J of the piston member 20J is accommodated in the rod hole 98 of the piston rod 14I according to the present embodiment so as to be capable of sliding.

The position of the guide member 18J in the radial direction is on the innermost side. The guide member 18J extends in a tubular shape (or a rod shape) in the axial direction along the central axis. An end part of the guide member 18J in the first direction is joined to the end wall 32 of the body 12. The guide member 18J is fixed so as to be incapable of being displaced in the axial direction and the circumferential direction with respect to the body 12. The second direction side of the guide member 18J projects out further toward the second direction side than the rod cover 16. The displacement switching grooves 40 are disposed in close proximity to an end part of the guide member 18J on the second direction side. The link pin 46 is inserted into the displacement switching grooves 40.

The position of the piston member 20J in the radial direction is located on the outer side of the guide member 18J. The shaft 44J of the piston member 20J is on the inner side of the piston rod 14I. The piston member 20J includes the piston 50B, the shaft 44J, and a piston hole 102. The piston 50B is disposed in the first cylinder chamber 26 of the cylinder hole 24. The shaft 44J extends in the second direction from the piston 50B.

The shaft 44J penetrates through the cover hole 16*a* of the rod cover 16, and projects out to the outer side of the rod cover 16. A part of the shaft 44J is accommodated in the rod hole 98 of the piston rod 14I. The shaft 44J includes, at a portion thereof that overlaps in the radial direction with the piston rod 14I, the helical grooves 52 that are inclined with respect to the axial direction. The link pin 46 is inserted into the helical grooves 52.

The piston hole 102 is positioned on the central axis of the piston member 20J. The piston hole 102 penetrates in the axial direction through the piston member 20J. The guide member 18J is disposed in the piston hole 102. The piston member 20J slides along the outer circumferential part of the guide member 18J through the piston hole 102. A packing 104 is disposed in the piston hole 102. The packing 104 serves to prevent leakage of the fluid from the first air chamber 26*a* along a gap between the guide member 18J and the piston member 20J.

The piston 50B having an elliptical shape is inserted through the piston hole 102. The piston hole 102 and the piston 50B are non-circular shaped, and therefore, serve to restrict the rotation of the piston member 20J with respect to the body 12. Accordingly, the piston member 20J does not rotate in the circumferential direction, and is capable of being displaced only in the axial direction.

A conversion mechanism 22J of the present embodiment is positioned outside the rod cover 16. The conversion mechanism 22J is constituted by the displacement switching grooves 40, the helical grooves 52, and the piston rod 14I including the link pin 46. In the conversion mechanism 22J, the piston rod 14I is positioned on the outer circumferential side in the radial direction, the helical grooves 52 are positioned in the middle in the radial direction, and the displacement switching grooves 40 are positioned on the innermost side in the radial direction. The link pin 46 is inserted into the displacement switching grooves 40 and the helical grooves 52, and slides along these grooves. The positional relationship in the axial direction and the circumferential direction between the link pin 46, the displacement switching grooves 40, and the helical grooves 52 is the same as that shown in FIG. 4B.

The cylinder device 10J according to the present embodiment exhibits the same effects and advantages as those of the cylinder device 10 shown in FIG. 1.

The above disclosure can be summarized as in the following manner.

One aspect of the present disclosure is the cylinder device 10, 10A, 10B, 10C, 10D, 10E, 10F, 10G, 10H, 10I, 10J including the guide member 18, 18A, 18B, 18C, 18F, 18G, 18H, 18I, 18J that is fixed in the circumferential direction and the axial direction, the piston member 20, 20A, 20B, 20C, 20F, 20G, 20I, 20J that is fixed in the circumferential direction and is displaced in the axial direction, the piston rod 14, 14D, 14E, 14F, 14G, 14H, 14I that is displaced in the circumferential direction and the axial direction, and the conversion mechanism 22, 22F, 22G, 22H, 22I, 22J that converts a portion of the displacement in the axial direction of the piston member into the displacement in the circumferential direction, and that transmits the displacement in the circumferential direction to the piston rod, wherein the conversion mechanism is disposed at a portion in which the guide member, the piston member, and the piston rod overlap in a radial direction, and the conversion mechanism includes the displacement switching groove 40 provided in either one of the guide member or the piston member, and including the axially directed part 40*a* that extends in the axial direction, and the circumferentially directed part 40*b* that extends in the circumferential direction, the axially directed part and the circumferentially directed part being connected in an L-shape, the helical groove 52 provided in another one of the guide member or the piston member, disposed so as to overlap the displacement switching groove in the radial direction, and inclined with respect to the axial direction, and the link pin 46 that is supported by the piston rod, extends in the radial direction, is inserted into the displacement switching groove and the helical groove, and moves along the displacement switching groove and the helical groove.

In the above-described cylinder device, since the guide member, the piston member, and the piston rod are capable of being connected by a single link pin, the number of the link pins is reduced, and the assembly can therefore be facilitated. Further, in the cylinder device, since the two grooves, namely, the helical groove and the displacement switching groove are disposed so as to overlap each other in the radial direction, the overall length can be made shorter compared to a conventional case in which the helical groove and the displacement switching groove are disposed alongside one another in the axial direction.

In the above-described cylinder device, at least a portion of an angular range of the circumferentially directed part of the displacement switching groove may overlap with an angular range of the helical groove, and an angle in the circumferential direction of the axially directed part of the displacement switching groove may be included in an angular range in the circumferential direction of the helical groove. This cylinder device, with a single link pin, is capable of causing the rotational displacement and the displacement in the axial direction to be generated in the piston rod, and hence the structure thereof can be simplified.

In the above-described cylinder device, the guide member may include the guide hole 38, 38C that extends in the axial direction, and the guide hole may accommodate the piston rod and the piston member. By accommodating the guide member within the first cylinder chamber, this cylinder device is capable of reducing the number of members that are disposed outside the body, and hence the structure thereof can be simplified. Further, by disposing the displacement switching groove on the outer circumferential side, the axial load can be distributed over a wider area, and hence the durability of the conversion mechanism can be enhanced.

In the above-described cylinder device, the piston member may include the piston hole 54, 88 which penetrates through the piston member in the axial direction, and through which the piston rod is inserted. Since this cylinder device causes the rotational force to be generated in the helical groove on the outer circumferential side of the piston rod, a larger rotational force can be generated in the piston rod.

In the above-described cylinder device, the guide member may include, in the guide hole, the third air chamber 56 that is capable of pressing the piston member. This cylinder device is capable of suppressing the amount of the fluid consumed during the extrusion stroke (the return operation).

The above-described cylinder device may further include the booster piston 64, 64E that is connected to the piston rod. This cylinder device enables an increase in the driving force of the piston rod in the axial direction. Further, the overall length of this cylinder device can be made shorter than in a case in which the booster piston is connected to the piston member.

In the above-described cylinder device, the piston member may include the non-circular piston 50B. This cylinder device is capable of preventing the piston member from rotating.

Moreover, the present invention is not limited to the above disclosure, and various modifications are possible without departing from the essence and gist of the present invention.

The invention claimed is:

1. A cylinder device, comprising:

a guide member configured to be fixed in a circumferential direction and an axial direction;

a piston member configured to be fixed in the circumferential direction and displaced in the axial direction;

a piston rod configured to be displaced in the circumferential direction and the axial direction; and a conversion mechanism configured to convert a portion of a displacement in the axial direction of the piston member into a displacement in the circumferential direction, and to transmit the displacement in the circumferential direction to the piston rod, wherein the conversion mechanism is disposed at a portion in which the guide member, the piston member, and the piston rod overlap in a radial direction, and the conversion mechanism includes:

a displacement switching groove provided in either one of the guide member or the piston member, and including an axially directed part configured to extend in the axial direction, and a circumferentially directed part configured to extend in the circumferential direction, the axially directed part and the circumferentially directed part being connected in an L-shape;

a helical groove provided in another one of the guide member or the piston member, disposed so as to overlap the displacement switching groove in the radial direction, and inclined with respect to the axial direction; and a link pin supported by the piston rod, and configured to extend in the radial direction, to be inserted into the displacement switching groove and the helical groove, and to move along the displacement switching groove and the helical groove.

2. The cylinder device according to claim 1, wherein at least a portion of an angular range of the circumferentially directed part of the displacement switching groove overlaps with an angular range in the circumferential direction of the helical groove, and an angle in the circumferential direction of the axially directed part of the displacement switching groove is included in the angular range in the circumferential direction of the helical groove.

3. The cylinder device according to claim 2, wherein:

the guide member includes a guide hole configured to extend in the axial direction; and the guide hole accommodates the piston rod and the piston member.

4. The cylinder device according to claim 3, wherein the piston member includes a piston hole which penetrates through the piston member in the axial direction, and through which the piston rod is inserted.

5. The cylinder device according to claim 4, wherein the guide member includes, in the guide hole, a third air chamber configured to press the piston member.

6. The cylinder device according to claim 1, further comprising a booster piston connected to the piston rod.

7. The cylinder device according to claim 1, wherein the piston member includes a non-circular piston.

* * * * *